US011558196B2

(12) United States Patent
Hassanzadeh et al.

(10) Patent No.: US 11,558,196 B2
(45) Date of Patent: Jan. 17, 2023

(54) PRIVACY PRESERVING USER AUTHENTICATION

(71) Applicant: ACCENTURE GLOBAL SOLUTIONS LIMITED, Dublin (IE)

(72) Inventors: Amin Hassanzadeh, Arlington, VA (US); Aditi Maheshwari, San Francisco, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 196 days.

(21) Appl. No.: 17/114,092

(22) Filed: Dec. 7, 2020

(65) Prior Publication Data
US 2022/0182239 A1  Jun. 9, 2022

(51) Int. Cl.
| *H04L 9/32* | (2006.01) |
| *G06F 3/041* | (2006.01) |
| *G06N 3/08* | (2006.01) |
| *G06F 3/01* | (2006.01) |
| *H04L 9/00* | (2022.01) |
| *G06F 21/30* | (2013.01) |

(52) U.S. Cl.
CPC ............ *H04L 9/3226* (2013.01); *G06F 3/016* (2013.01); *G06F 3/04144* (2019.05); *G06F 21/30* (2013.01); *G06N 3/08* (2013.01); *H04L 9/008* (2013.01)

(58) Field of Classification Search
CPC ...... G06F 3/04144; G06F 3/016; G06F 21/30; H04L 9/3226; H04L 9/008; G06N 3/08
See application file for complete search history.

(56) References Cited

U.S. PATENT DOCUMENTS

| 2020/0287878 A1* | 9/2020 | Allen .................... H04L 63/10 |
| 2021/0240266 A1* | 8/2021 | Gajiwala ............. G06F 3/03547 |
| 2021/0240805 A1* | 8/2021 | Knoppert ............. G06F 21/316 |
| 2021/0306147 A1* | 9/2021 | Aharoni ................ G06F 17/18 |

* cited by examiner

*Primary Examiner* — Afroza Chowdhury
(74) *Attorney, Agent, or Firm* — Mannava & Kang, P.C.

(57) ABSTRACT

Examples of privacy preserving authentication are provided. A system may obtain a first input from a user on a touchpad. The touchpad may include a sensor array with multiple force sensitive resistors. Further, the system may identify a set of sensor electrodes of the sensor array that may be actuated on receiving the first input. The system may further determine a region of interest on the touchpad. Furthermore, the system may construct various matrices indicative of position, pressure, and directional characteristics associated with the user input. Furthermore, the system may generate a feature vector based on processing the matrices through a neural network. Furthermore, the system may generate an encrypted feature vector based on encrypting the feature vector by using a private key of the user and a homomorphic encryption function. The system may further provide an authorized access to the user based on performing authentication of the user using the encrypted feature vector.

20 Claims, 14 Drawing Sheets

PRIVACY PRESERVING USER AUTHENTICATION

BACKGROUND

Many existing security systems involve the use of biometric devices, radio-frequency identification tags, facial recognition, and the like to authorize a user for accessing secured resources or secured locations, such as buildings. Typically, these security systems require a user to share his or her personal information, such as fingerprints, facial data, and other biometric data with another party. As the personal information of the user is sensitive data and often irreplaceable, many organizations that collect, store, and manage users' personal data are under constant threat of malicious use from hackers or nefarious actors. Furthermore, although these security systems enable authorized access to the user i.e., by authenticating the user based on his or her personal information (e.g. signatures, credentials etc.), many of these security systems do not or may be unable to protect confidentiality of the personal information which may be shared by the user for user authentication. Accordingly, there is a growing need for organizations to have effective security mechanisms in place to protect against any compromise related to data privacy, data confidentiality, and data integrity that may occur to personal data.

Typically, some existing security systems require the user to provide a unique identifier such as, for example, a passcode or a security personal identification number (PIN), that may be used as personal security information for the user to authorize the user for secured access. For instance, to obtain access to a physical location (e.g. an office building) or a digital location (e.g. a smartphone) the user may be required to provide his or her signature or passcode as a unique identifier, based on which the user may be authenticated. However, there always exists a limitation on a number of such unique identifiers that may be used by the security systems for accurately performing user authentication. In this regard, in order to increase the diversity of unique number of such identifiers, it may be required to increase the complexity of the unique identifier. For example, a signature length may be increased or a combination of signatures, for instance, in the form of multi-factor authentication, may be used. However, the increase in the complexity has a direct and immediate impact on the performance of the security system, which may require substantial time for processing and matching a complex signature structure. Not only does this lead to the expenditure of critical processing resources, it may also be inconvenient for the user for whom the wait time for being get authenticated may increase. Also, committing such complex unique identifiers to memory and then reproducing them on an input interface may also be challenging for the average user, and especially challenging for some other users, such as minors. At the same time, even the enhanced complexity of unique identifier remains vulnerable to unauthorized access due to access at least to the party performing the registration and the user authentication.

Accordingly, a technical problem with the currently available security systems for authenticating the users is the lack of fast and secure access to the users without compromising on privacy of user credentials that the user may provide for authentication. Accordingly, there is a need for an efficient security system that can provide hassle-free authentication the user to access a restricted location or a secured device along with preserving the user's privacy and credentials provided for authenticating the user.

DETAILED DESCRIPTION

Figure 1:
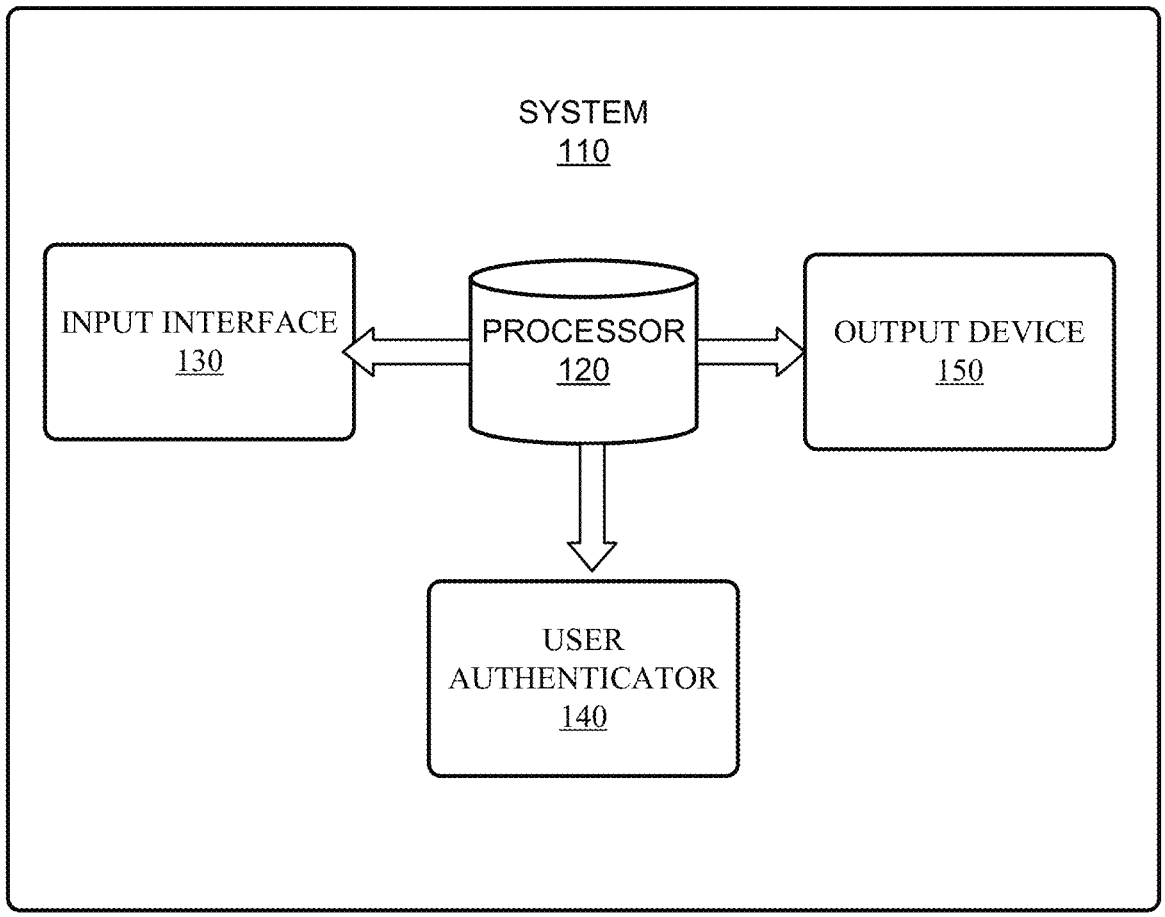
FIG. 1 illustrates a diagram for a system for user authentication, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes systems and methods of authenticating a user for granting access to a secured location. In some examples, the secured location referred herein can correspond to any of a physical location (e.g. a corporate building, a residential complex etc.) or a physical object (e.g. a locker, a storage unit etc.) or a digital location (e.g. an electronic device, a smartphone, a database, a gaming device, etc.) or a digital storage location (e.g. a datacenter etc.). According to an aspect, the present disclosure discloses an efficient security technique that may preserve privacy and confidentiality of credentials provided by the user for user authentication and may also enable hassle free and quick access to the user for a restricted location (e.g. a corporate building, a residential premise, a datacenter etc.) or a secured system (e.g. a smartphone, a laptop, a locker device etc.).

An authentication system (referred to as "system" hereinafter) described herein may have application at variety of places, such as, for example, offices, banks, residential buildings, digital storage systems, electronic devices, and/or the like. The system may include an input interface (e.g. a touchpad), a processor, and a user authenticator. In some examples, the input interface may include one or more components that may be defined on a substrate made of flexible material (e.g. a piezoelectric based material or a conductive textile). The input interface may include a touchpad and associated electronic circuitry that may be capable of recognizing a touch or pressure based input. The input interface may include a touchpad and a sensor array with multiple sensor electrodes that are based on force sensitive resistors. The input interface of the system may be used for receiving a user input (e.g. a signature or unique identity) of the user for registration and authentication purposes.

In an example embodiment, the system may obtain a first user input that may be received from a user on the input interface. The system may identify a set of sensor electrodes of the input interface that may be actuated upon receiving the first input. Further, the system may determine a region of interest on the input interface. The region of interest may correspond to a portion of the touchpad of the input interface including the set of sensor electrodes. Further, the system may analyze the first user input to construct, a first binary matrix, a first pressure matrix, and a first orientation matrix. The first binary matrix may include a first set of data values. The first set of data values may be indicative of the set of sensor electrodes in the region of interest that may be activated upon receiving the first input. The first pressure matrix may include a second set of data values. The second set of data values may be indicative of pressure applied at a sensor element of each sensor electrode in the region of interest. Further, the orientation matrix may include a third set of data values. The third set of data values may be indicative of a sequence of the actuation of the set of sensor electrodes in the region of interest of the input interface. The system may utilize the first pressure matrix, the first binary matrix, and the first orientation matrix to generate a first feature vector. The first feature vector may represent a unique identifier (e.g. a unique signature) of the user that may be obtained from the first user input. The first feature vector may be determined based on processing data from the matrices.

According to an example embodiment, the system may provide the first pressure matrix, the first binary matrix, and the first orientation matrix as input data to a neural network. The input data may be processed through one or more network layers of the neural network and the first feature vector may be generated as an output of the neural network. Further, the system may obtain a second input from the user. The second user input may be indicative of a private key of the user. The system may encrypt the first feature vector to generate an encrypted feature vector. The system may utilize homomorphic encryption to encrypt the first feature vector. The system may perform homomorphic encryption on the first feature vector by using the private key and a homomorphic encryption function. In an example, the encrypted feature vector may be used for registration of the user. Further, the encrypted feature vector may be used for authentication of the user. Furthermore, the system may provide an authorized access to the user based on successful authentication of the user.

In an example embodiment, the system may be capable of identifying and learning one or more characteristics such as, number of contact points, location of contact points, direction of motion, pressure value at each contact point, etc. associated with the user input provided on the input interface. Further, the system may utilize these characteristics to generate a unique signature value (i.e. the feature vector) which may be further used to register an identity of the user. Additionally, the system may be capable of encrypting this unique signature value. The system may perform encryption based on a homomorphic encryption function. The system may encrypt the signature using a private key provided by the user. Based on encryption, it may be ensured that the unique signature value is recognizable and known only to the user and not known to any other person. For enabling authorized access to a person, the system may perform a matching of homomorphically encrypted signature value against another homomorphically encrypted signature value which may be stored at a time of user registration. Further details of the user authentication are described in reference to description of FIGS. 1-12. Thus, the system may prevent forgery and unauthorized persons from entering to a secured or restricted location.

By way of various example embodiments described herein, the system may conduct an authentication of a person by using a person's unique identifier (e.g. a signature or a pattern) without requiring the person to share his or her personal identity information (e.g. facial images, biometrics, hackable passwords or PINs etc.) which are usually required in most of existing security systems. Further, the system also enables the user to move hassle free without carrying any identity card everywhere and taking care of its possession all the time so as to get access to restricted locations. Further, the system also enables authentication of the people with disabilities. In this aspect, in accordance with some example embodiments described herein, the input interface of the system which may be used for receiving user inputs can be made up of flexible material and may be installed at any place as per user's convenience. The input interface of the system may be designed on a flexible substrate and may be of variable size, so that it may be installed in any configuration. A scalability to design the input interface on a flexible substrate enables it to be mounted in a configuration such that even persons who are supported on wheelchairs may access it from a lower height. Further, the input interface of the system may be designed such that people with insufficient motor control in their hands, missing fingers or Symbrachydactyly, may also utilize the input interface for marking their identity. Also, the input interface of the system may be capable of supporting stylus pens, and the like, input interface that may enable people with skin allergies or abrasions also to use the system as described hereinafter with reference to FIGS. 1-12.

DESCRIPTION

FIG. 1 illustrates a system 100 for user authentication, according to an example implementation of the present disclosure. In an example, the system 100 may include a processor 120, an input interface 130, a user authenticator 140, and an output device 150. The processor 120 may be coupled to one or more of the input interface 130, the user authenticator 140, and the output device 150.

As illustrated in FIG. 1, the system 100 may include the input interface 130. In an example embodiment, the input interface 130 may correspond to a component that may obtain an input from a user. In some examples, the input may be obtained for authenticating the user to get an access to an authorized location. In another example, the input may be obtained for authenticating the user to get an access to a device (e.g. an electronic device, smartphone, a datacenter, etc.). In another example, the input may be obtained for authenticating the user to get an access to a secured physical object (e.g. a Blackbox, a locker etc.).

In an example, the input interface 130 may receive a user input as a unique combination of one or more markings (e.g. lines) that the user may draw on an interface (e.g. a touchpad) of the input interface 130. As an example, the input interface 130 may receive the user input in the form of a signature. In another example, the input interface 130 may receive the user input in the form of a pattern. In an example embodiment, the input interface 130 may receive the user input by a physical touch (e.g. by a user's finger or a stylus) from the user on a touchpad of the input interface. In another example embodiment, the input interface 130 may receive the user input from an input device (e.g. a stylus pen) that may be used by the user.

According to an example embodiment, the input interface 130 may include a touchpad, a sensor array, and a printed circuit board. The sensor array of the input interface 130 may include multiple sensor electrodes. The sensor electrodes of the input interface 130 may be capable of sensing a touch-based input received on the touchpad of the input interface 130. The sensor electrodes may be organized in a grid or an array across a substrate of the input interface 130. In some example embodiments, the input interface 130 may be defined on a substrate that is made of flexible material, details of which are described later in the description. In some examples, the sensor electrodes may correspond to force sensitive resistors. In other words, each sensor electrode may include a force sensor element and a resistor. In an example, the sensor electrodes of the input interface 130 may be capable of sensing pressure applied at that respective sensor element which may cause a change in resistance of a resistor associated with the sensor electrode. This change in the resistance may be converted into digital value or signal. The input interface 130 may include a microcontroller that may record, from one or more sensor electrodes, all such digital signals corresponding to the touch-based input to derive a user input in entirety as received on the input interface 130. In an example, the touch-based user input may be indicative of a unique identifier (e.g. signature) received from the user.

According to an example embodiment, sensor values from the sensor electrodes of the input interface 130 may be utilized by the microcontroller of the input interface 130 to identify various additional characteristics associated with the touch-based input. For instance, in an example, location of each touchpoint (i.e. point of contact) on the touchpad of the input interface may be recorded by the microcontroller. In another example, the input interface 130 may receive the touch-based input and the microcontroller of the input interface 130 may derive a degree of pressure applied while making a contact each touch point on the touchpad. In other words, the microcontroller may identify a pressure value associated with each sensor electrode that may be activated based on the touch-based input. Further, the microcontroller of the input interface 130 may determine directional information associated with the user's touch-based input on the touchpad. The directional information may be associated with a direction or manner of movement followed by an input mechanism (e.g. user's finger or stylus pen) while providing an input on the touchpad of the input interface 130. For instance, a user may mark a user input on the touchpad by making a contact by his or her fingers starting from a top left corner of the touchpad and further moving towards a bottom-right corner of the touchpad. In another example, another user may start from bottom right portion of the touchpad and move towards the top left portion of the touchpad to mark his or her input. In an example, the microcontroller of the input interface 130 may record a sequence of actuation of each electrode from the plurality of sensor electrodes of the input interface 130 to determine the directional information. More details related to the input interface 130 and operations of its various components are described later in reference to FIGS. 2-14.

As illustrated in FIG. 1, the system 100 may include the user authenticator 140. In an example, the user authenticator 140 may obtain the input from the input interface 130. In an example, the input obtained by the user authenticator may be given by the user on the input interface 130. In an example, the user authenticator 140 may determine from the input a unique identity associated with the user that may be used for authentication of the user. For example, the user authenticator 140 may identify from the user input an identity of the user that may indicate at least one of a signature or a unique pattern. According to some example embodiments, the user authenticator 130 may obtain the user input in response to the occurrence of an event. For instance, the user authenticator 130 may obtain the user input in response to receiving the touch-based input on the touchpad of the input interface 130. In some examples, the user authenticator 130 may obtain a user input subsequent to an initial calibration of various components of the input interface 130 of the system 100 that may be performed as described in following paragraph.

According to some example embodiments, the system 100 includes the processor 120 that may perform an initial configuration of one or more components of the system 100. For example, the processor 120 may calibrate various components of the input interface 130 as per initial configuration parameters. The calibration of the input interface 130 may be performed before a first use. In an example, as the system 100 is powered ON, the processor 120 may perform initial configuration (i.e. calibration) of the input interface 130. The processor 120 may record a first average reading of each sensor element of the sensor electrodes of the input interface 130. Further, the processor 120 may obtain an initial input on the input interface 130 and use it for calibrating various configuration parameters. In this regard, the processor 120 may set the first average reading obtained from each sensor as a baseline value. In this aspect, any subsequent changes at individual sensor electrodes may be recorded in accordance with base reading i.e. the first average reading of each sensor that is used for calibration. Further, upon the initial configuration, the input interface 130 may be ready to operate and receive user inputs. In some examples, the processor 120 may be configured to record individual sensor readings associated with the input interface 130 as an effect of a contact made by the user on the touchpad. The sensor readings may correspond to a change in resistance or capacitance values that may be associated with individual sensor electrodes of the input interface 130. The processor 120 may be coupled to the microcontroller of the input interface and may receive such sensor readings. Further, the processor 120 may record sensor readings in form of digital signals and identify digital values corresponding to the sensor readings based on activation of each sensor electrode of the input interface 130.

Illustratively, the system 100 includes the user authenticator 140 coupled to the processor 120. The user authenticator 140 may perform authentication of the user based on a user input provided by the user on the input interface 130. Further, the user authenticator 140 may enable access to the user for a secured location based on the user authentication. In an example embodiment, the user authenticator 140 may obtain the user input from the input interface 130. The user authenticator 140 may include one or more components that may determine various information by analyzing the user input. For instance, in an example, the user authenticator 140 may construct one or more two-dimensional matrices based on an analysis of an input data. In an example, the matrices may be constructed based on using various sensor values (e.g. digital signals) that may have been associated with individual sensor electrodes of the input interface 130 in response to receiving the input from a user on the input interface 130. Further, these matrices may record data values corresponding to various characteristics (e.g. pressure value, directionality, location) associated with sensor values recorded at each sensor electrode of the sensor array of the input interface 130 in response receiving of the touch-based user input. More details of the construction of the matrices by the user authenticator 130 are further discussed in reference to FIGS. 2-14, in the description.

According to various example embodiments described herein, the user authenticator 140 may determine a feature vector based on the processing of one or more matrices constructed from the user input. In some examples, the user authenticator 130 may employ a feature vector generator that may utilize neural network for processing an input data. The feature vector generator may provide the matrices as input data to an input layer of a neural network. Further, the user authenticator 140 may determine the feature vector as an output from the neural network. The feature vector may represent a unique identifier obtained from the user input. The feature vector may be indicative of a unique output value that may distinctly identify the user input. In other words, no two distinct user inputs can be used to generate a same feature vector upon such processing by the neural network. Accordingly, the user authenticator 130 may be capable of determining different feature vectors for different touch-based user inputs.

Further, in accordance with some example embodiments described herein, the user authenticator 130 may encrypt the feature vector based on a private key of the user. In some examples, the user authenticator 130 may use a homomorphic encryption function to compute the encrypted feature vector. The encrypted feature vector may be used for registration of the user. For performing the user registration, the user authenticator 130 may compare the encrypted feature vector with pre-existing registration information (e.g. pre-registered encrypted feature vectors). In an example, the comparison may also involve a calculation of a similarity score, further details of which are described later in the description. In this aspect, if the similarity score is above a pre-defined threshold, the user authenticator 140 may determine that a successful registration of the user may be performed using the encrypted feature vector. Alternatively, the user authenticator 130 may deny the registration of the user and send a notification to the user for reattempting the registration.

In an example embodiment, the user authenticator 140 may generate a first feedback indicative of the successful registration of the user. The first feedback may be outputted to the user by the output device 150. In another example, where the similarity score is below the pre-defined threshold, the user authenticator 140 may determine that a user registration attempt using the encrypted feature vector may not be successful, as the encrypted feature vector is similar to some extent with the pre-registered encrypted feature vectors. In this aspect, the user authenticator 140 may generate a second feedback indicative of an unsuccessful registration of the user. Further, the second feedback corresponding to an unsuccessful registration attempt may be outputted to the user by the output device 150. In some examples, the second feedback may also request the user to reattempt with a new user input (e.g. signature or pattern) on the input interface 130.

According to some example embodiments, the user authenticator 130 may authenticate a person for getting an authorized access. The authorized access may represent an access to a restricted location (e.g. a corporate building, a residential complex, a data center etc.) or a digital location (e.g. a storage system, an electronic device, a digital file, a smartphone, a data storage device etc.). The user authenticator 130 may authenticate the user for the authorized access based on user authentication. The user authentication may involve a comparison of the user input provided on the input interface 130 by the user with pre-registered information, more details of which are described later in reference to FIGS. 2-12.

As illustrated in FIG. 1, the system 100 may include the output device 150. In an example, the output device 150 may generate one or more notifications as stated earlier. The notification may be in the form of a visual output on display device 252 or an audio output on a speaker 254 that can notify a user for an event. In an example, the output device 150 may generate a notification indicative of the success of registration of the user. In another example, output device 150 may generate a notification indicative of the success of the authentication of the user. In another example, the output device 150 may generate a notification indicative of the failure of registration of the user. In another example, the output device 150 may generate a notification indicative of the failure of the authentication of the user.

Figure 2:
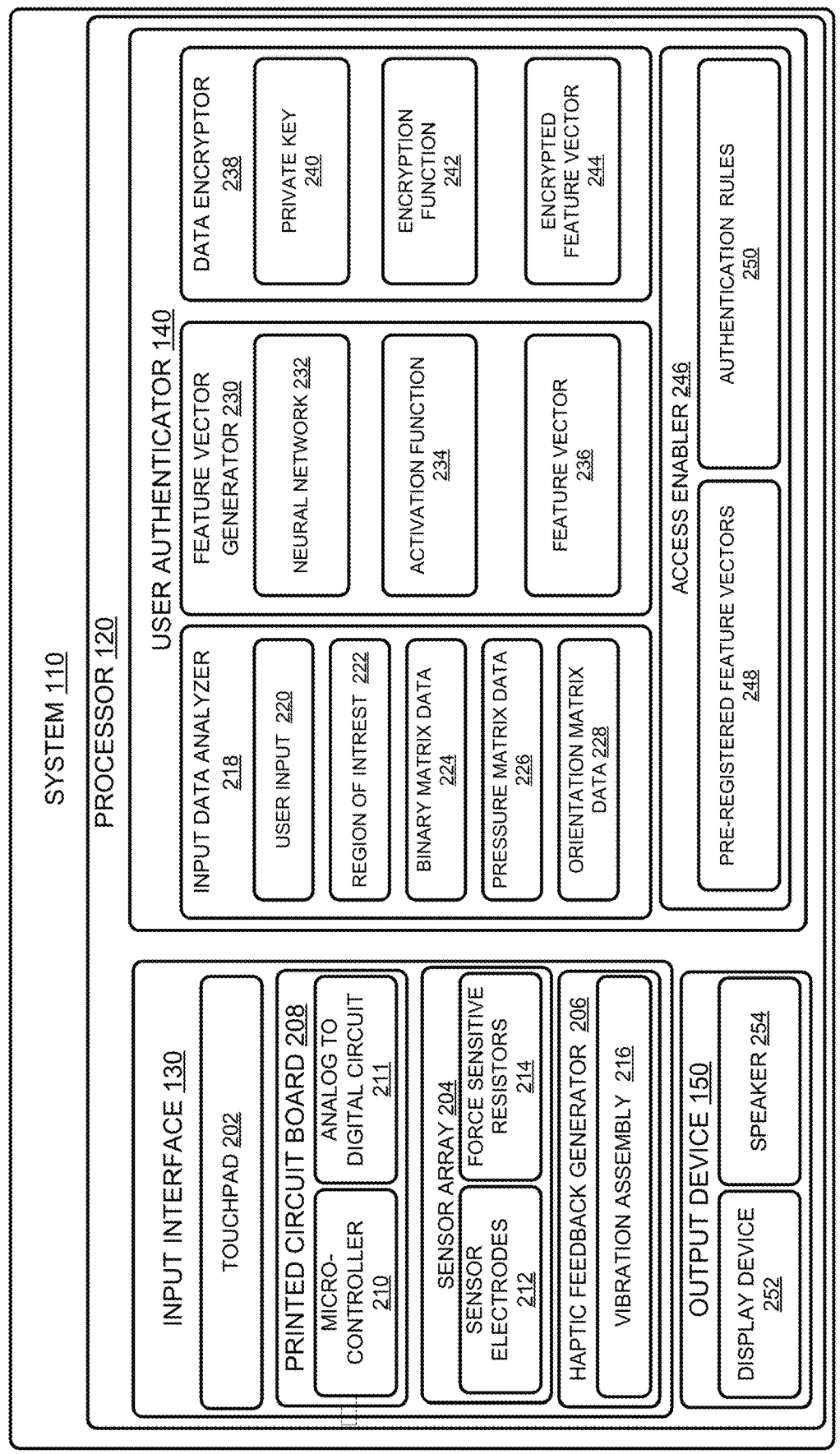
FIG. 2 illustrates various components of a system for user authentication, according to an example embodiment of the present disclosure.

FIG. 2 illustrates various components of the system 100 for user authentication, according to an example implementation of the present disclosure. In an example, the system 100 may include the processor 120, the input interface 130, and the user authenticator 140. In an example embodiment, the processor 120 may be coupled to one or more of the input interface 130, the user authenticator 140, the output device 150, and/or various subcomponents that may be associated with these components.

In an example embodiment, the input interface 130 may correspond to an electronic device for receiving a user input.

For example, the input interface 130 may correspond to any of, a trackpad, a human-machine interface (HMI), and/or the like. Illustratively, the input interface 130 input interface may include a touchpad 202 (e.g., a touchscreen). Further, the input interface 130 may include a sensor array 204, a haptic feedback generator 206, and a printed circuit board (PCB) 208. In an example embodiment, the touchpad 202, the sensor array 204, and the haptic feedback generator 206 may be coupled to the PCB 208 of the input interface 130.

According to some example embodiments, the touchpad 202 of the input interface 130 may be used for receiving a user input. In an example, the user input may correspond to a unique identity (e.g., a signature, a pin, a password) of the user. In an example, the input interface 130 may receive the user input (e.g., a first input) on the touchpad 202 to perform a registration of the user. The user registration may refer to the recording or storing various information associated with the user so that the system 100 may recognize the user at a future time instance. In an example, the system 100 may perform the user registration to authorize the user to access a secured location and/or device. In another example, subsequent to successful registration, the input interface 130 may receive another user input to obtain access to an authorized location and/or device.

According to an example embodiment, the input interface 130 may receive the first input from the user in the form of a unique identifier for registration purposes. In an example, the user input may be provided by drawing a pattern on the touchpad 202. In another example, the user input may be provided by drawing a signature on the touchpad 202. The touchpad 202 of the input interface 130 may receive the user input based on any input mechanism, for example, but not limited to, by user's fingers, palm, or any body part, or a stylus. The input interface 130 may receive the user input for various purposes, e.g., but not limited to, for providing a signature for user registration, for providing a request for user authentication to get an authorized access, as an affirmation gesture from the user, etc.

In accordance with some example embodiments, the input interface 130 may include one or more components that may be capable of identifying one or more characteristics that may be associated with the user input. In an example, these characteristics may correspond to a set of locations on the touchpad 202 where the user may have contacted on the touchpad 202 while providing a touch-based input. As an example, the microcontroller 210 of the input interface 130 may identify one or more co-ordinates of touchpoints on the touchpad 202 at which the user may have contacted while providing the touch-based input. These coordinates may be associated with one or more sensor electrodes 212 that may have been activated by the physical contact from the user on the touchpad 202. Further, the microcontroller 210 may also identify other characteristics from the user input. As another example, the microcontroller may identify a pressure value at which the user marks a contact on any touchpoint on the touchpad 202. Furthermore, in another example, the microcontroller 210 may also determine characteristics such as a direction of movement of an input mechanism (e.g., a user's finger or a stylus) on the touchpad 202, as the user provides the touch-based input on the touchpad 202. In other words, the direction of movement may correspond to a sequence or order in which the sensor electrodes 212 of the sensor array 204 may have been activated and triggered a digital signal in response to the user input.

In accordance with some example embodiments, the input interface 130 may also include one or more components that may be capable of performing various operations. In an example embodiment, the input interface 130 may include components to: (a) identify digital signals corresponding to a unique identifier that may be drawn by the user on the touchpad 202, (b) sense and record various values that may be utilized by the microcontroller 210 to identify characteristics (e.g., location, pressure, direction) from the user input, and (c) provide a feedback to the user based on the occurrence of an event (e.g., a success or failure to capture the user input for a registration, a success or failure to recognize the user input by matching it with pre-registered information, etc.).

As illustrated, the input interface 130 may include the touch pad 202. In an example, the touchpad 202 may correspond to a user interface (e.g., touchscreen) having an electronic visual display. The touchpad 202 may be capable of receiving a user input based on the making of a touch or contact at any portion of the touchpad 202 by the user. Such a contact may be made using any input mechanism, e.g., but not limited to, one or more fingers, stylus, palm, etc. In an example, the touchpad 202 may be designed based on a force-resistive sensor technology. In an example, the touchpad 202 may include a panel and may further include several electrically charged layers that may be accumulated to form a substrate.

Further, as illustrated, the input interface 130 may include the sensor array 204. In an example, the sensor array 204 may be defined on a substrate made of flexible material. The sensor array 204 may include multiple sensor electrodes 212, each having a sensor element (e.g., a force or pressure sensor). In an example, the sensor electrodes 212 may be organized in a grid or a pre-defined pattern according to a resolution of the touchpad 202. In some examples, the electrically charged layers may be separated by a thin space, thereby defining various sensor electrodes 212. In this aspect, the one or more electrically charged layers of the touchpad 202 may cause an actuation of the sensor electrodes 212 in response to receiving of a contact made by the user on the touchpad 202. Activation of any sensor electrode 212 based on the user contacting the touchpad 202 may trigger a change any of: a voltage value or capacitance value, and/or a resistance value of resistor associated with the respective sensor electrode 212. The microcontroller 210 of the input interface 130 may be capable of registering such a change in the form of a digital signal.

In another example embodiment, the touch screen 202 may correspond to a capacitive sensor-based touchpad. In this regard, the capacitive sensor-based touchpad may include a layer of insulating material, such as glass that may be coated with a transparent conductor. In an example, a touch input on the touch screen 202 with a finger may result in a change in the electrostatic field of the touchpad 202 that may be recorded by one or more capacitors of the input interface 130. Further, this change may be registered as a digital signal by the microcontroller 210.

As stated earlier, according to an example embodiment, the input interface 130 may include the sensor array 204 having multiple sensor electrodes 212. Each sensor electrode 212 may be associated to a force sensitive resistor 214. In accordance with some example embodiments, the input interface 130 may be defined on a material that may cause a change in resistance of the force sensitive resistor 214 corresponding to a respective sensor electrode when a force or pressure is applied on the touchpad 202 (e.g., due to a touch-based input). In some examples, the force sensitive resistors 214 of the input interface 130 may be made up of one or more conductive films and may include one or more substrate layers. Further, the force sensitive resistors 214 may include one or more openings that may be aligned with an active area. In an example, when an external force is applied on a touchpoint on the touchpad 202, a sensor electrode below the touchpoint may get activated. In this aspect, a conductive film of the force sensitive resistor of the sensor electrode may get deformed against one or more substrates and/or may come into contact with a conductive print on the substrate, thereby changing a resistance associated with the force sensitive resistor 214. Accordingly, the microcontroller 210 of the input interface 130 may record these changes (e.g., changes in resistance associated with the resistor of the force sensitive resistors) in the form of digital signals corresponding to touch-based input provided by the user on the touchpad 202.

As illustrated in FIG. 2, the input interface may comprise of the PCB 208. In an example, the PCB 208 may comprise of the microcontroller 210. The PCB 208 may also include various other components such as, but not limited to, an analog to digital converter (ADC) 212. Further, various components on the PCB 208 may be coupled to the microcontroller 210, more details of which are described in reference to FIG. 6.

As illustrated in FIG. 2, the input interface 130 may also include the haptic feedback generator 206. In an example, the haptic feedback generator 206 may generate an electric current that drives a response to create a vibration. The haptic feedback generator 206 may include a vibration assembly 216 that may generate a haptic feedback in the form of a vibration on the input interface 130. The haptic feedback may be generated in response to the occurrence of an event. In an example, the haptic feedback generator 206 may generate a feedback indicative of a notification to the user. In an example, the notification may be indicative of the success of registration of the user. In another example, the notification may be indicative of the success of the authentication of the user. In yet another example, the notification may be indicative of a failure of the authentication of the user. In yet another example, the notification may be indicative of a failure of registration of the user. In yet another example, the notification may be generated in response to any input provided by the user on the input interface 130. Further details of the input interface 130 are described in reference to FIGS. 4-6.

As illustrated in FIG. 2, the system 100 may include the user authenticator 140. The user authenticator 140 may correspond to a component that may authenticate a user for an authorized access (e.g., to a physical location, an electronic device, etc.). The user authenticator 140 may receive a request to authenticate a person to provide authorized access to a location. The user authenticator 140 may authenticate the user based on a user input that may be provided by the user on the input interface 130.

In an example embodiment, the user authenticator 140 may be coupled to the processor 120. The user authenticator 140 may include an input data analyzer 218. The input data analyzer 218 may obtain a user input 220 and analyze the user input 220 for various purposes. In an example, the input data analyzer 218 may analyze the user input 220 for registration of the user for an authorized access (e.g., to a physical location, an electronic device, etc.). In another example, the input data analyzer 218 may perform an authentication of the user based on the user input 220. In an example, the user input 220 may correspond to an input that may be received from a user on the input interface 130. In an example, the user input 220 may correspond to a signature, a passcode, a personal identification number (PIN), and/or a pattern that the user may provide on the input interface 130 as his or her unique identity.

According to an example embodiment, the input data analyzer 218 may utilize the user input 220 to determine a region of interest 222 on the input interface 130. The region of interest may correspond to a cropped portion of the touchpad 202 of the input interface 130. In an example, the region of interest 222 may include few sensor electrodes from amongst all of the sensor electrodes 212 of the input interface 130 that may have been actuated in response to one or more contact made by the user on the touchpad 202. In other words, the region of interest 222 may be identified based on selecting that portion of the input interface 130, which may include a set of sensor electrodes that may have been actuated from amongst all of the sensor electrodes 212 of the input interface 130 in response to the user input 220. Said differently, the set of sensor electrodes 212 may be such electrodes of the input interface 130 that may have been actuated as the user makes contact on the touchpad 202 of the input interface 130 while providing the user input 220.

In an example embodiment, the region of interest 222 may be identified by the input data analyzer 218 based on a binary pixelation technique. In this regard, the input data analyzer 218 may refer to binary values (i.e., '0' or '1') associated with digital signals that may be recorded based on the actuation of the sensor electrodes 212 of the input interface 130. The input data analyzer 218 may select the set of electrodes for which binary value 1 is recorded in response to the user input. Further, the input data analyzer 218 may crop a portion of the touchpad 202 that may include a maximum number of binary values '1' as identified from the binary pixelation and designate it, as the region of interest 222.

According to an example embodiment, the input data analyzer 218 may analyze the user input 220 to derive various information related to the user input 220. In an example, the input data analyzer 218 may analyze the user input 220 to construct a binary matrix. The binary matrix may correspond to a file that may store binary matrix data 224. The binary matrix data 224 may include a first set of data values in binary form, i.e., either '0' or '1'. These data values may be identified by processing digital signal information recorded by the microcontroller 210 in response to the user input 220 on the touchpad 202. Each data value of each element (e.g., data point or co-ordinate) of the binary matrix may be associated to a sensor electrode of the sensor electrodes 212 of the sensor array 204 that may or may not have been actuated in response to the user input 220 on the input interface 130. Accordingly, all elements of the binary matrix may have a value as '1' that may represent some sensor electrodes from the sensor electrodes 212 that may have been activated due to a contact made by the user on the touchpad 202 while providing the user input 220. Further, remaining elements of the binary matrix, which may have a value '0', may represent remaining sensor electrodes of the sensor electrodes 212, which may not have been activated by the user input 220. Accordingly, the input data analyzer 218 may construct the binary matrix data 224 with elements having values '1' or '0' depending on the actuation of the sensor electrodes 212 of the input interface 130 recorded at the microcontroller 210. In accordance with some example embodiments, a size (e.g., length) of the binary matrix may depend on a resolution of the touchpad 202 of the input interface 130. As an example, the binary matrix may include same number of rows and columns as that in a grid of the sensor electrodes 212 of the sensor array 204.

In an example, the input data analyzer 218 may construct the binary matrix corresponding to a part of the user input which is received in the region of interest portion of the input interface 130. In this aspect, the input data analyzer 218 may construct the binary matrix 224 based on using a set of data values associated with the set of sensor electrodes in the region of interest of the input interface 130. Alternatively, in some example embodiments, the input data analyzer 218 may construct the binary matrix for the entire user input received on any portion of the input interface 130.

According to an example embodiment, the input data analyzer 218 may construct a pressure matrix, including a pressure matrix data 226 based on the analysis of the user input. The pressure matrix data 226 may include a second set of data values that may be indicative of pressure applied at each sensor electrode based on contacting of the user on the input interface 130 while providing the user input. The pressure values may be associated with the activation of a respective sensor electrode of the set of sensor electrodes in the region of interest of the input interface. In an example, the input data analyzer 218 may construct an orientation matrix. The orientation matrix may include orientation matrix data 228 having a third set of data values. The third set of data values may be indicative of a sequence of the actuation of the set of sensor electrodes in the region of interest of the input interface.

In an example, user authenticator 140 may include a feature vector generator 230. The feature vector generator 230 may be coupled to the processor. In an example, the feature vector generator 230 employ a neural network 232 to process an input data. The feature vector generator 230 may be capable of utilizing machine learning techniques, deep learning, and/or neural networks to process an input data. In an example, a feature vector generator 230 may provide the binary matrix, the pressure matrix, and the orientation matrix, as input data to the neural network 232. In an example, the neural network 232 may correspond to a deep neural network (e.g., a convolutional neural network or a recurrent neural network) having an input layer, an output layer, and multiple hidden layers. In accordance with an example embodiment, the feature vector generator 230 use one or more activation functions 234 to process the input data. Accordingly, the feature vector generator 230 may process the input data through the neural network 232 to determine a feature vector 236, further details of which are described in reference to FIG. 10. The feature vector 236 determined based on various characteristics of the user input may represent a unique identifier that may be used to register an identity of the user.

As illustrated, the user authenticator 140 may include a data encryptor 238. The data encryptor 238 may be coupled to the processor 120. The data encryptor 238 may perform an encryption of the feature vector determined by the feature vector generator 230. In an example, the data encryptor may obtain a user input (e.g., a second input) from the user to encrypt the feature vector 236. In an example, the second input may be provided by the user on the input interface 130. Alternatively, in some examples, the second input may be provided by the user by any other input device external to the system 100. In an example, the second input may correspond to a private key 240 of the user based on which the user may wish to encrypt the feature vector 236. In an example, the data encryptor 238 may use the feature vector 236 and the private key 240 to generate an encrypted feature vector 244. In an example, the data encryptor 238 may generate the encrypted feature vector 244 by performing a homomorphic encryption on the feature vector 236. In this aspect, the data encryptor 238 may perform the encryption by using an encryption function 242 (e.g. a homomorphic encryption function) and the private key 240 (i.e., the second input) provided by the user. Encrypting the feature vector 236 based on homomorphic encryption enables the user authenticator 130 to process and manipulate the feature vector in the encrypted form, e.g., during data storage or at a time of user authentication. The encrypted feature vector 244 may be stored in a database by associating the encrypted feature vector 244 with user data provided by the user.

As illustrated, the user authenticator 140 may include an access enabler 246. In an example, the access enabler 246 may be coupled to the processor through a wired or wireless communication network. In an example embodiment, the access enabler 246 may use the encrypted feature vector 244 for performing registration of the user. For purpose of user registration, the encrypted feature vector 244 and other additional user data that may be provided by the user for registration may be stored in a user registration database by the access enabler 246. An example use case including details related to registration of the user is described in reference to FIG. 7.

In an example embodiment, the access enabler 246 may provide access to the user to a restricted area or a secured device. The access enabler 246 may perform authentication of the user to determine if the user is a registered user. The access enabler 246 may provide access to the user based on successful user authentication. The access enabler 246 may perform authentication of the user based on the encrypted feature vector 244. In an example embodiment, the access enabler 246 may obtain pre-registered feature vectors 248 to perform the authentication of the user. The pre-registered feature vectors 248 may include other encrypted feature vectors that may have been existing in a user registration database. The access enabler 246 may perform authentication of the user based on evaluating the encrypted feature vector 244 with the pre-registered feature vectors 248. The access enabler 246 may utilize one or more authentication rules 250 to perform such an evaluation. In some examples, the access enabler 246 may compute a similarity score to identify if the encrypted feature vector 244 matches with any of the pre-registered feature vectors 248. An example use case of authentication of the user is described in reference to FIG. 8.

Accordingly, based on the user authentication, the access enabler 246 may provide access to a restricted location or a secured device to the user. According to an example embodiment, the access enabler 246 may generate one or more feedbacks based on a successful and/or an unsuccessful registration and/or authentication of the user. For instance, in an example, the access enabler 246 may generate a notification indicative of successful authentication of the person. In another example, the access enabler 246 may generate a notification indicative of an unsuccessful authentication of the person. In some examples, these notifications may be provided to the user via the output device 150.

As illustrated, the output device 150 may include, for example, a display device 252 and a speaker 254. These components may be capable of providing various notifications and/or feedbacks to the user in visual and/or audio form.

In some example embodiments, both of the input interface 130 and the user authenticator 140 together may be part of the same system. Alternatively, in some example embodiments, the user authenticator 140 may be remotely located from the input interface 130. In this aspect, one or more functionalities of the user authenticator 140, as described in accordance with various example embodiments herein, may be performed remotely e.g., by the cloud-based system, details of which are described hereinafter with reference to the description of FIG. 3.

Figure 3:
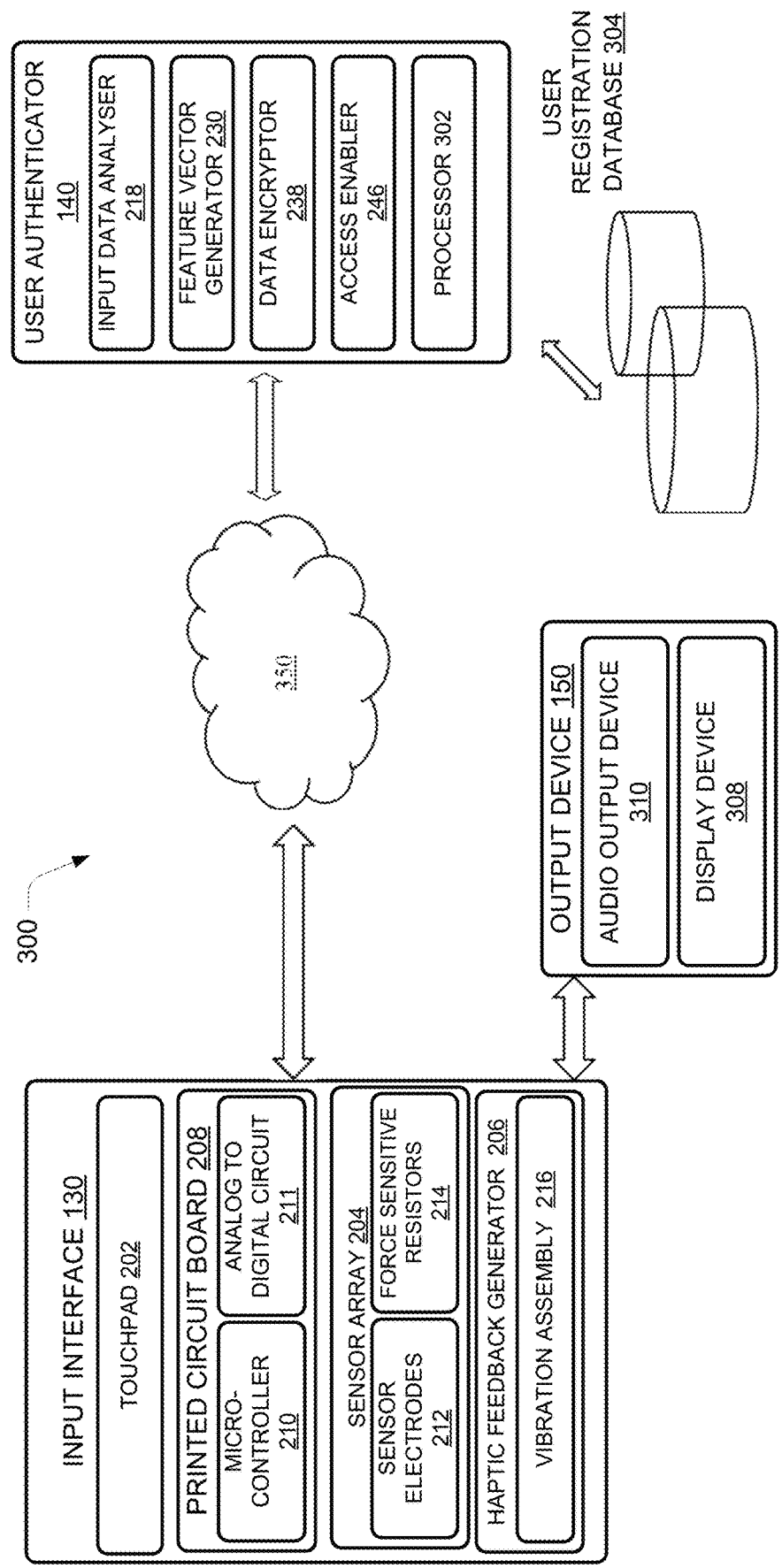
FIG. 3 illustrates various components of a system comprising an input interface, a user authenticator, and an output device for user authentication, according to another example embodiment of the present disclosure.

FIG. 3 illustrates various components of a system 300 that may include the input interface 130, the user authenticator 140, and the output device 150, according to another example embodiment of the present disclosure. As illustrated in FIG. 3, in an example embodiment, the input interface 130 and the user authenticator 140 may be located separately with respect to each other. For instance, in one example, the input interface 130 may be located at an entry gate of a restricted area (e.g., a corporate building, a residential complex, a registration kiosk etc.) and the user authenticator 140 may be located remotely at a server location (e.g. back end of a registration kiosk). The input interface 130 may be communicatively coupled to the user authenticator 140 via a communication network 350. Illustratively, the input interface 130 may be communicatively coupled to a cloud based system that may provision the user authenticator 140. In an example, the cloud based system can correspond to any cloud computing supported service, platform, infrastructure, a distributed computing network, and/or a combination thereof. The cloud based system may support performing various operations in a distributed manner based on utilization of one or more distributed processing and data storage capabilities. In some example embodiments, the user authenticator 140 may be configured by the cloud based system that may be based on any of software-as-a-service (SAAS), platform-as-a-service (PAAS), infrastructure-as-a-service (IAAS). For purposes of brevity, such distributed processing capabilities (i.e. processing resources) may be collectively referred as a processor 302 as illustrated in FIG. 3.

In accordance with an example embodiment, the input interface 130 may receive an input from a user (e.g., person A) in the form of a unique identifier. As described earlier in reference to FIGS. 1-2, the user input that may be a pattern, a passcode, a PIN, a signature, and/or the like. In an example, the user input may be received to perform a registration of the person A. For purposes of brevity, the user input received for registration of the user may be referred hereinafter as a first user input. Further, another user input that may be received from the user for encrypting a unique identifier may be referred hereinafter, as second user input.

Illustratively, the input interface 130 may include one or more sensing electrodes 212 that may be associated to force sensitive resistors 214. As described earlier in FIG. 2, the force sensitive resistors 214 may sense a change in resistance in effect of the user input on the touchpad 202. In an example, the change in the resistance and the capacitance can be transformed into a digital signal representative of the user input on the input interface 130. In this aspect, one or more digital signals representative of the user input may be communicated to the user authenticator 140 via the communication network 350 for further processing.

Thus, data pertaining to any input that may be received on the input interface 130 may be transmitted to a remotely located user authenticator 140 via the communication network 350. In one example, such data may be transmitted in near real time, i.e. in response to receiving of the user input on the input interface 130. Alternatively, in another example, the user authenticator 140 may periodically poll for any user input information that may have been received on the input interface 130 by sending a request for such information, via the communication network 350, to the input interface 130. The input interface 130 may provide the user input and information associated with the user input to the user authenticator 140. Accordingly, any subsequent user inputs, data, and/or commands may be exchanged between the input interface 130 and the user authenticator 140 by utilizing the communication network 350. The communication network 350 illustrated herein may correspond to any of wired or wireless communication network.

In an example, the user authenticator 140 may include an input data analyzer 218. In an example, in response to obtaining the user input data, the input data analyzer 218 may analyze the user input to identify various characteristics associated with the input data that may be used to generate a unique identifier of the user (i.e. person A). In an example, a first feature vector may be generated by the user authenticator 140 based on the first user input. The first feature vector may represent a unique identity associated with the user (i.e. person A). According to an example embodiment, the user authenticator 140 may generate the feature vector 236 based on analyzing the first user input using the neural network 232. The user authenticator 140 may include the input data analyzer 218 to perform the analysis on the first user input. The analysis of the first user input may include creating a first binary matrix, a first pressure matrix, and a first orientation matrix each representative of various characteristics (e.g., pixel location, pressure value, directionality) associated with the first user input. These matrices may be created in a similar manner as described earlier in reference to FIGS. 1-2.

Further, in an example, the input interface 130 may receive another user input (e.g., a second user input). The second user input may be utilized to encrypt the first feature vector. In an example, the second user input may correspond to the private key 240 that may be provided by the user. The second user input may be used for encrypting the feature vector generated by the user authenticator 140. In another example, the second user input may be received via any other input mechanisms other than the input interface 130. In some example embodiments, the user authenticator 140 may send a request via the communication network 350 to the input interface 130 to obtain the second user input. Accordingly, the user authenticator 140 may obtain the second user input that may be transmitted by the input interface 130 to the user authenticator 140, via the communication network 350.

As described earlier in reference to FIG. 2, the user authenticator 140 may include the data encryptor 238. The data encryptor 238 may encrypt the feature vector 236 based on the second user input received from the input interface 130. The data encryptor 238 may encrypt the feature vector based on the second user input (e.g., the private key 240). In an example, the data encryptor 238 may perform encryption of the first feature vector based on performing a homomorphic encryption on the first feature vector, as described in reference to FIG. 2. Accordingly, the data encryptor 238 may generate a first encrypted feature vector 244 as an output that may be utilized for performing the user registration. The first encrypted feature vector may represent a unique identifier of the user (i.e. the person A) in an encrypted format.

According to said example embodiment, the user authenticator 140 may perform a matching of the first encrypted feature vector 244 with pre-existing encrypted feature vectors to maintain uniqueness of the first feature vector. In other words, the user authenticator 140 may perform a comparison or similarity matching of the encrypted first feature vector 240 with existing encrypted feature vectors that may already be stored in a user registration database 304 to ensure that no two users may be registered based on same encrypted feature vectors. Further, in response to identifying that the encrypted feature vector 244 is different from the pre-existing feature vectors, the user authenticator 140 may perform the registration of the user (i.e. the person A).

Illustratively, the user authenticator 140 may be communicatively coupled to the user registration database 304. The user registration database 304 may store information related to existing registered users. As an example, the user registration database 304 may include the pre-registered encrypted feature vectors 248 that may have been stored at the database 302 while performing registration of other users.

In accordance with an example embodiment, in response to identifying that the encrypted feature vector 244 is unique and doesn't matches with the pre-registered encrypted feature vectors 248 in the user registration database 304, the user authenticator 140 may store the encrypted first feature vector 140 in the user registration database 304. Further, according to said example embodiment, the encrypted feature vector data 240 stored in the user registration database 304 may be retrieved by the user authenticator 140 at a later stage (e.g., any future instance of user authentication). In this regard, the user authenticator 140 may send a request for retrieving such an information to the user registration database 304. In some example embodiments, the user authenticator 140 may request for additional details from the user that may be required for completing a registration process. In an example, these additional details may be requested via the output device 150 that may be communicatively coupled to one or more of the input interface 130 and the user authenticator 140. The output device 150 may include a display device 308 (e.g. a display screen) and an audio output device 310 (e.g. speaker, an LED indicator) that may be utilized to provide such requests to the user.

In an example, the input interface 130 may also be capable of receiving such additional details and sharing it with the user authenticator 140, via the communication network 350. Accordingly, these additional details may be stored in the user registration database 304 to complete the user registration process of the user (i.e. person A).

According to an example embodiment, the user authenticator 140 may receive a request to authenticate a person (e.g., person A or person B) to enable an authorized access to the person. In some examples, this request may be received at a later instance of time i.e. post registration of the person. At this instance, the input interface 130 may receive an input from the person (e.g., a third input). In an example, the third input referred herein may correspond to an input which the person may provide to authorize himself/herself for obtaining access to a restricted area or secured device.

According to said example embodiment, the user authenticator 140 may identify if the person requesting for the authentication is a registered person or not. In this aspect, according to an example, the user authenticator 140 may perform various operations to authenticate the person for enabling the access to an authorized location or device. Following paragraph describes an example of such operations that may be performed by the user authenticator 140 to authenticate the user.

In an example embodiment, the input data analyzer 218 of the user authenticator 140 may analyze the third user input received by the person. This analysis may be performed to match if an encrypted feature vector (e.g., a second encrypted feature vector) generated from the third user input matches with any existing encrypted feature vectors (i.e. the pre-registered feature vectors 248) in the user registration database 304. Based on this analysis, the user authenticator 140 may identify if the person requesting for authentication is a registered user or not. In accordance with said example embodiment, the user authenticator 140 may perform various steps to generate a second encrypted feature vector from the third user input. The input data analyzer 218 may determine various characteristics by analyzing the third user input. As an example, the input data analyzer 218 may determine a second binary matrix, a second pressure matrix, and a second orientation matrix from the third user input. Further, the user authenticator 140 may provide information pertaining to the three matrices (pixel locations, pressure values, and directional data) as input data to the feature vector generator 230. Further, the feature vector generator 230 may generate the second feature vector based on processing the input data through the neural network 232. Furthermore, the data encryptor may encrypt the second feature vector based on a private key of the person. In this aspect, the person may provide another user input (i.e. a fourth user input) on the input interface 130 that may be shared with the user authenticator 140, via the communication network 350.

In an instance, it may so happen that the person may be the same person whose unique identification has been registered (i.e. Person A). In another instance, the person may not be the same person (e.g., Person B) whose unique identification has not been registered. In other words, the request for authentication may be provided by a non-registered person. As an example, a person with malicious intent may attempt to obtain access by providing an input (i.e. the third input) on the input interface 130. In such scenarios, the user authenticator 140 may authenticate the person based on comparison of the second encrypted feature vector obtained from the third user input with the pre-registered feature vectors 248. Accordingly, the user authenticator 140 may compare the second encrypted feature vector corresponding to the third user input with pre-registered encrypted feature vectors in the user registration database 304. Based on the comparison the user authenticator 140 may authenticate the person and allow or deny access to the person.

According to an example embodiment, the user authenticator 140 may also be coupled to the output device 150. In an example, the user authenticator 140 may generate an output that may inform a user about any of a successful registration, an un-successful registration, a successful authentication, and/or an un-successful authentication. As described earlier, the output device 150 may provide such notifications to the user in audio (e.g. a beep sound) or visual form (e.g. a screen blinking).

Figure 4:
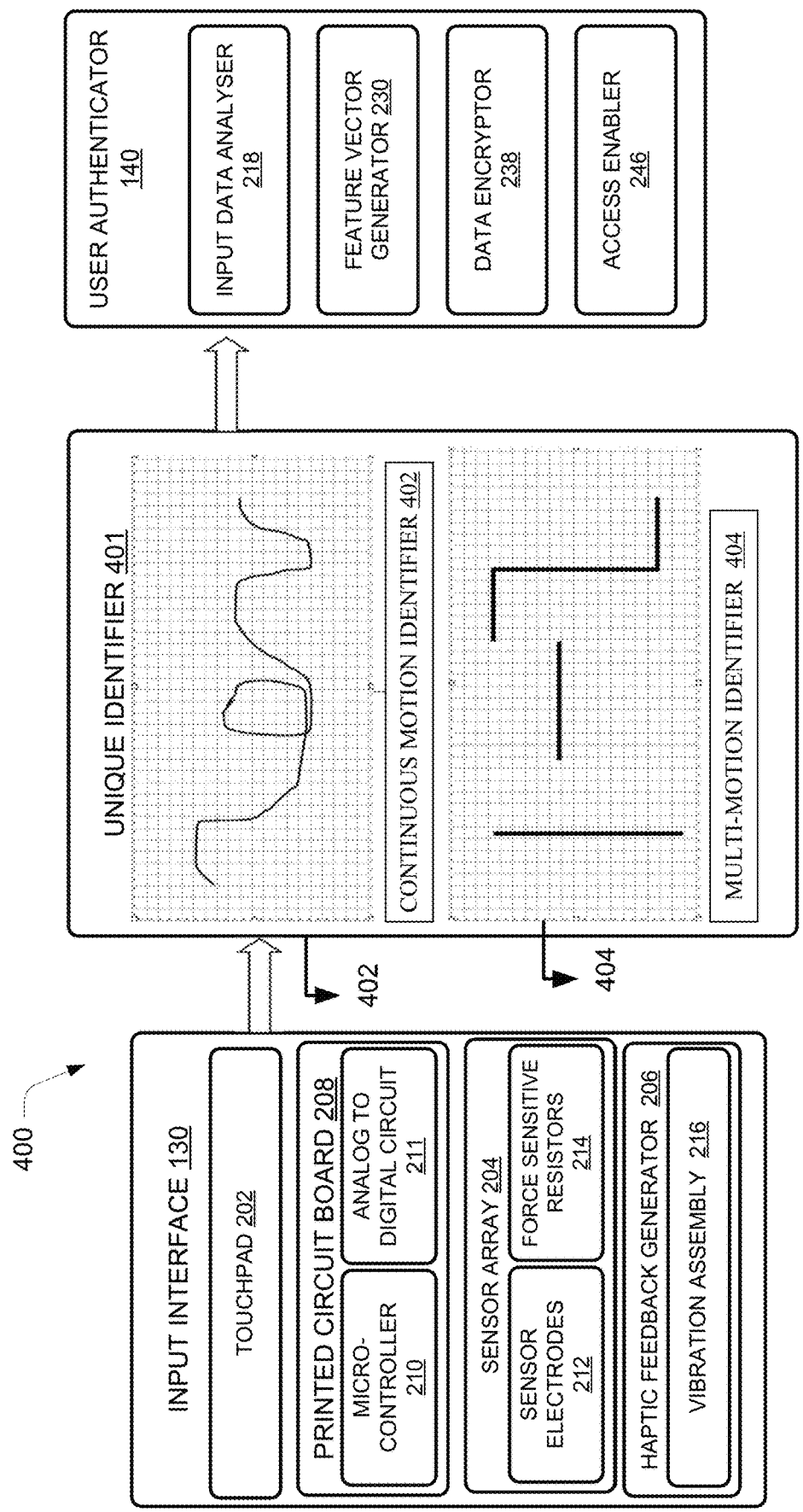
FIG. 4 is a pictorial representation illustrating a use case of obtaining an input from a user on the input interface of the system for user authentication, according to an example embodiment of the present disclosure.

FIG. 4 illustrates a pictorial representation of receiving an input from a user on the input interface 130 by the system 100, according to an example embodiment of the present disclosure. In some examples, the user input may correspond to a unique identifier 401 that may be received in various forms by a user on the touchpad 202. In an example embodiment, the user identifier 401 received on the touchpad 202 may represent a unique identity, e.g., a pattern, a signature, a passcode, a PIN provided by the user.

FIG. 4 illustrates two example forms in which the user may provide his or her unique identifier 401 as the user input on the touchpad 202. In an example, the input interface 130 may receive a first user input 402 in form of a continuous marking on a screen (e.g. the touchpad 202) of the input interface 130. In another example, the input interface 130 may receive a second user input 404 in form of multiple distinct markings (e.g., lines) that may be provided at separate locations (also referred herein as touchpoints) on a screen (e.g. touchpad 202) of the input interface 130. Various other forms or manner of providing the user input on the input interface 130 may be possible, in accordance with example embodiments described herein.

According to an example embodiment, the input interface 130 may be made up of a printed and flexible material. In some examples, various components of the input interface 130 as described in reference to FIGS. 1-3 may be located on a printed fabric, or a substrate made up of flexible material (e.g., a piezoelectric substance). Alternatively, the input interface 130 may be defined on a rigid surface or a solid non-flexible substrate. The input interface 130 may be of any size and resolution. The size and resolution of the input interface 130 may be varied depending on a utility. For instance, in some examples, a size and resolution of the input interface 130 may depend on a manner in which the input interface 130 is to be mounted and/or installed at a location for use. Further, the input interface 130 may be installed at any height depending upon a usage. and person being authenticated.

As illustrated, in an example, the input interface 130 may receive a unique identifier (e.g., the first user input 402) that may be drawn on a surface or screen of the input interface 130 based on a single continuous motion of an input mechanism (e.g., fingers, stylus) used by the user. In another example, the second user input 406 may be received on the input interface 130 based on intermittent motion of the input mechanism used by the user. Accordingly, the input interface 130 may receive any combination of one or more lines or patterns that may be marked by the user on the input interface 130. In accordance with some example embodiments, the input interface 130 may include components that may be designed to identify inputs of various forms that may be provided by the user on the touchpad 202. For instance, in an example embodiment, the input interface 130 may include a continuous motion identifier 406 and a multi-motion identifier 408 as illustrated in FIG. 4. The continuous motion identifier 406 may be capable of identifying the first user input 402 by recognizing a continuous motion of a user's input mechanism (e.g., finger or stylus pen) on the touchpad 202 of the input interface 130. Further, the multi-motion identifier 408 may be capable of identifying the second user input 404 based on intermittent motion of the user's input mechanism on the input interface 130.

The input interface 130 as illustrated in FIG. 3 may receive inputs of various types for various purposes. In an example, the input interface 130 may receive such a user input to perform registration of the user. In another example, the input interface 130 may receive such an input to obtain access to an authorized location (e.g., corporate office) or an access controlled system (e.g., smartphone device, datacenter etc.). In another example, the input interface 130 may receive another user input to encrypt an identity information (e.g., signature, passcode etc.) that may be provided by the user for user registration. In an example, the input interface 130 may receive this user input as a private key of the user to encrypt an information associated with the user. As another example, the input interface 130 may receive on the touchscreen another user input that may be indicative of a user affirmation that the user may provide after successful registration of the user's signature. Further, the input interface 130 may also be capable of receiving user inputs of types other than as illustrated in FIG. 4. For instance, in some examples, the input interface 130 may receive a user input in form of a dotted pattern, instead of a continuous striking of the user's finger on the touchscreen. The dotted pattern may correspond to a coded pin that the user may provide on the touchscreen based on actuation on few selected electrodes of the input interface 130.

Figure 5:
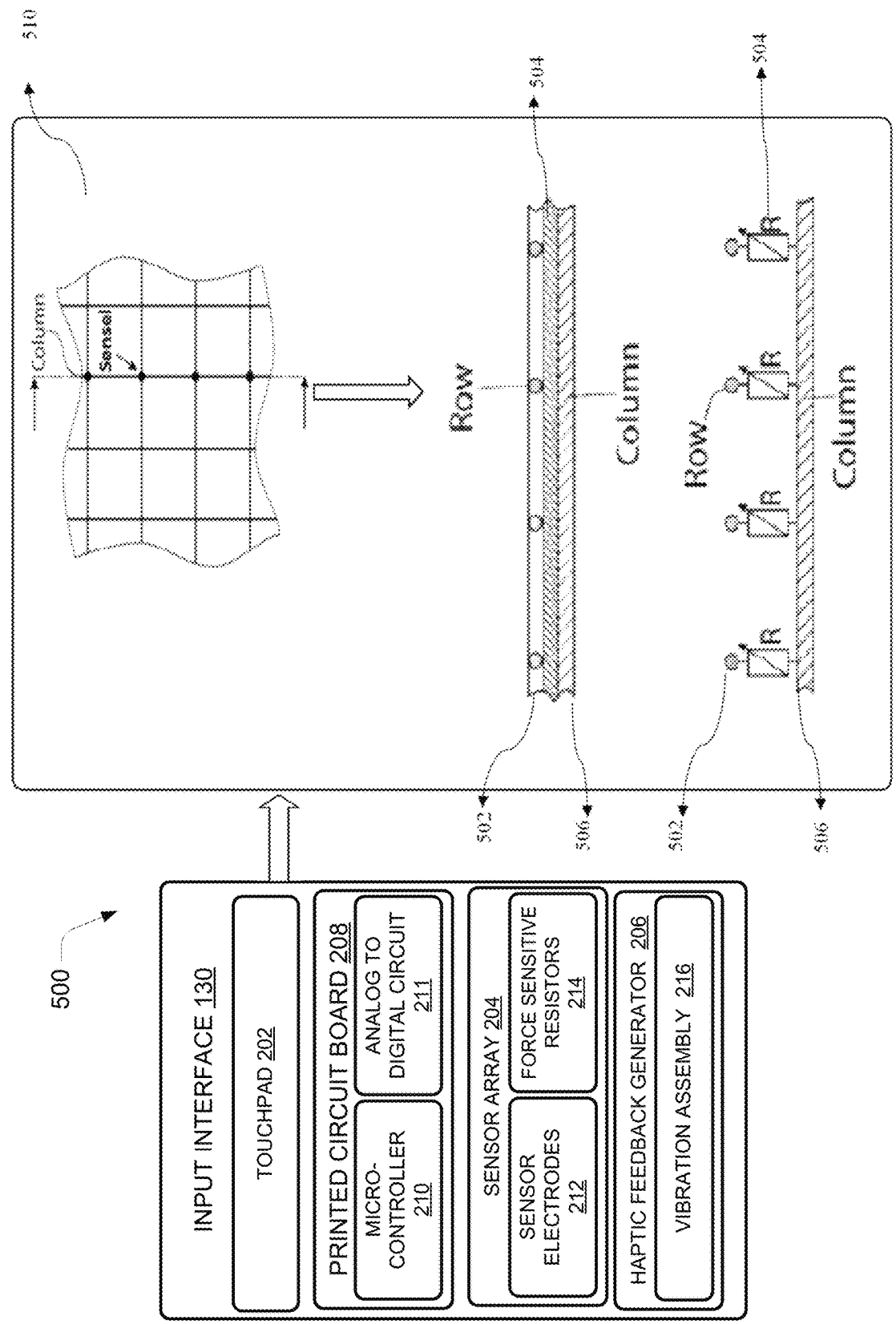
FIG. 5 illustrates a pictorial representation of a sensor grid of the input interface of the system for user authentication, according to an example embodiment of the present disclosure.

FIG. 5 illustrates a pictorial representation of various components of a sensor grid of the input interface 130 of the system (100, 300), according to an example embodiment of the present disclosure. As described in reference to FIG. 2, the input interface 130 may include the touchpad 202, the sensor array 204, the haptic feedback generator 206, and the PCB 208.

In an example, the touchpad 202 may comprise a substrate with plurality of layers. For instance, in an example, the touchpad 202 may include a pressure matrix defined by three layers: a top layer, a Velostat layer, and a bottom layer. In some examples, the top layer and the bottom layer may be made up of a conductive material. In some examples, individual sensors forming a sensor grid on the touchpad 202 may comprise of multiple pieces of a Velostat. In an example, these pieces of the Velostat may be separated by a distance to prevent shorting. Further, each piece of the velostat may be connected to the microcontroller 210 through analog input.

According to an example embodiment, the touchpad 202 may correspond to a touch screen on which a user may provide a user input. In an example, the touch pad 202 may comprise of a screen, fabric or another flexible substrate. Illustratively, the input interface 130 may include a matrix of sensor arrays 204 that may be positioned below the touchpad 202. The sensor arrays 204 may be made using multiple layers as described earlier and illustrated in a view 510 in FIG. 5. In an example, the sensor arrays 204 may include one or more layers that may be separated by a piezoelectric layer. For instance, according to an example embodiment illustrated in FIG. 5, the sensor array may include a first conductive electrode 502 and a second conductive electrode 504. The sensor array may also include a piezoelectric layer 506 that may be positioned (e.g. sandwiched) in between the first conductive layer 502 and the second conductive layer 504. As an example, the sensor grid 510 illustrates an arrangement having the first conductive layer 502, the second conductive layer 504, and the piezoelectric layer 506 sandwiched between the two conductive layers.

According to some example embodiments described herein, each of these layers may be made up of a flexible substrate. In an example, the first and second conductive electrode layer may be made up of copper foil. In another example, the first conductive electrode layer 502 and second conductive electrode layer 504 may be made up of conductive threads. In an example, the piezoelectric layer 506 may be velostat, linqstat, eeonyx fabric, knit, woven or felted steel fiber blends or steel fiber yarn blends. In an example, the layers composing the matrix may allow pressure evaluation due to the intersection of conductive rows and columns which are distanced by a piezo resistive layer. In an example, each intersection in the grid may act as an individual sensor capable of reading pressure applied on it. Accordingly, each sensor element may correspond to an intersection between the rows and columns of the conductive layers.

In accordance with some example embodiments, the sensor array 204 of the sensor grid may include multiple sensor electrodes 212 that may be organized in some pattern. In accordance with an example embodiment, individual sensor elements (i.e. sensor electrodes) of the input interface 130 may be made up of flexible piezoelectric materials, for example, but not limited to, Velostat or Force-Sensitive Resistors (FSR) 214. The sensor electrodes 212 of the sensor array may be configured such that an input by a user on the touchpad 202 may cause an actuation of one or more sensor elements of the sensor array 204. The actuation (or activation) of the sensor electrodes 212 referred herein at multiple instances throughout the description may correspond to a change in a sensor value associated with a respective sensor electrode. In an example, each sensor electrode 212 of the same sensor array 204 may correspond to a force sensitive resistor 214 that may be capable of sensing a change in a resistance value in response to receiving a user input on the touchpad 202.

Further, in accordance with said example embodiment, the sensor electrodes 212 of the input interface may be communicatively coupled to the printed circuit board 208 and/or the microcontroller 210. In an example, the printed circuit board 208 may also be defined on a substrate made up of a flexible material.

According to an example embodiment, as a user draws an input (e.g. passcode, pattern, PIN, signature etc.) on the touchpad 202, individual sensor electrodes 212 of the sensor array 204 may pick up electrical signals based on changes in a resistance value of their respective force sensitive resistors 214. The change in resistance value is due to an effect of force applied a touchpoint on the touchpad 202 that may be associated with an individual sensor electrode 212. According to an example embodiment, an output line of each sensor electrode 212 may be coupled to the analog to digital converter circuit 212 that may convert an analog pressure signal to a digital signal representing the magnitude of the voltage or current. The microcontroller may record these digital values to detect which sensor electrode (or set of sensor electrodes) 212 have been activated due to the user input on the touchpad 202. Further, based on this information, the microcontroller 210 may also register and derive various additional information associated the user input such as, but not limited to, location information (e.g. X co-ordinate and Y co-ordinate of an input mark on the touchpad 202 and its associated sensor electrode 212, pressure value corresponding to each input mark etc.). Further details related to the circuitry of the input interface are described in reference to FIG. 6.

Figure 6:
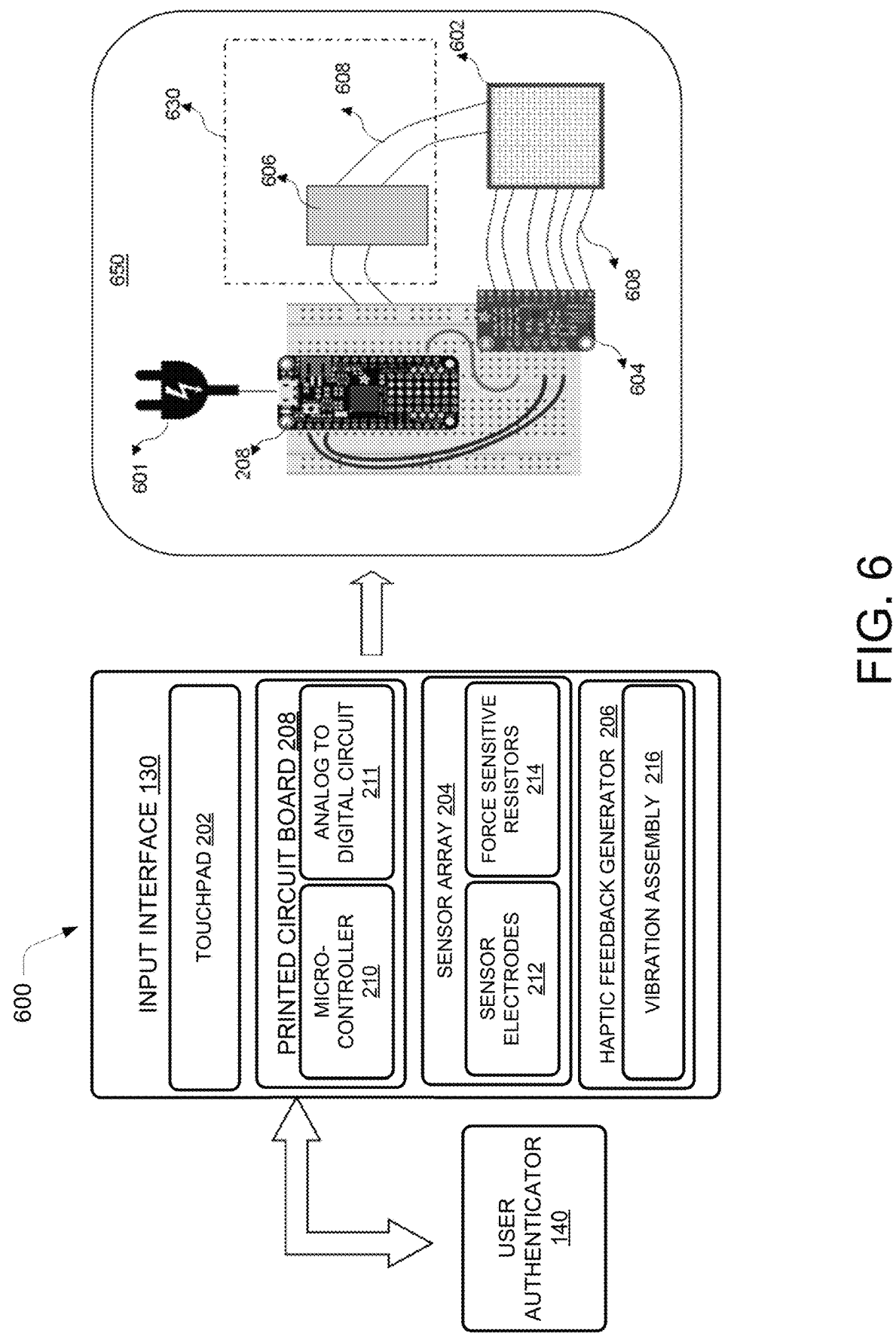
FIG. 6 illustrates a pictorial representation of a circuit design of the input interface of the system for user authentication, according to an example embodiment of the present disclosure.

FIG. 6 illustrates a pictorial representation of a circuitry 600 of the input interface 130 of the system 100, according to an example embodiment of the present disclosure. As described earlier, the input interface 130 may include the sensor array 204 having multiple sensor electrodes 212 that may be organized in a grid. In an example, the sensor array 204 and its associated circuitry may be organized such that an arrangement (e.g. a matrix) of multiple pressure dependent voltage dividers is formed. In this aspect, an output voltage of each of the pressure voltage divider may be fed into the ADC circuit 212, via a multiplexer. The microcontroller 210 may control operations of the multiplexer and record data corresponding to digital signals.

In an example embodiment, each pressure-dependent voltage divider of the sensor array may include a variable resistor (i.e. a sensor element) and a fixed resistor. As described earlier in reference to FIG. 5, these sensor elements may be arranged in multiple columns and rows, thereby forming a grid type arrangement. According to various example embodiments described herein, a number of columns and rows of the sensor grid may vary depending on a size and resolution required for the input interface 130. In accordance with said example embodiment, a high side of all sensor elements in a column may be connected to one output of a shift register and a low side of all sensor elements in a row may be connected to a fixed ground-resistor and an analog switch input. Further, the microcontroller 210 may control the shift register and the analog switch based on a defined sensor scanning rule. For example, according to one sensor scanning rule, each row of the sensor array may be connected one at a time to an analog input pin at the microcontroller 210 by the analog switch and a voltage at respective end may be measured. Further, at the same instance, each column of the multiple columns of the sensor array may be energized one at a time by the shift register. In this manner, sensor voltages at respective rows and columns may be measured.

In an example circuit design of the sensor grid, each row and column outputs of the sensor may be fed into the microcontroller. During a calibration of the input interface 130, a two-dimensional array data structure based file may be created with similar dimensions as that of the sensor grid. The 2D array may hold data representative of resistance values corresponding to each sensing element in the sensor grid.

In an example, the circuit design of the input interface 130 may include a pair of nested loops that may be used to access one or more grid points of the sensor grid, one at a time. In this aspect, an outer loop of the circuit design may iterate over one or more wires of the columns of the sensor grid. Further, during the calibration, a wire matching to iteration count may be set to HIGH and other wires may be set to LOW. Furthermore, the inner loop may iterate over the rows of the sensor grid such that, a voltage of a row matching the inner loop's count may be obtained by the microcontroller 210. This computation may be performed to obtain a value representative of a resistance between the high column and the specific row. In some examples, tuning may be performed to reduce noise in the sensing data. In an example, the raw data may be processed through a filter and sampled at a rate of a few frames per second. In another example, the raw data may be smoothed using a moving average. In another example, the raw data may be smoothed using a butterworth or frequency based filter.

In some examples, signal quality outputted by sensor elements of the sensor grid 602 may be improved by having a higher bit ADC 212. Further, a data (e.g. capacitance values or resistance values) recorded by the microcontroller 210 may be smoothed and filtered based on any known signal smoothing techniques that may involve use of filters. In an example, a two-way low pass Butterworth filter may be used to eliminate electrical spikes recorded in values captured by the microcontroller 210. Further, the microcontroller 210 may compare the recorded data (i.e. resistance or capacitance values) to baseline data to identify an increase or decrease in the values that may be indicative of capturing of a user input on the user interface 130.

In some example embodiments, the input interface 130 may include the touchpad 202 (e.g. a flexible trackpad) and the sensor array 204 having multiple sensor electrodes 212 that may be organized in such a manner that a full resolution (i.e. input receiving surface) of the touchpad 202 remains conductive and may receive input from the user at any point on the surface of the touchpad 202. In this aspect, sensor readings corresponding to the user input provided on the touchpad 202 may be measured from distinct points (i.e. respective sensor electrodes). Further, as stated earlier, a user input (e.g. a signature) may be read by the microcontroller 210 based on detecting a change in capacitance or resistance value that may be caused due to user contacting (e.g. touching) on various points in different areas of the touchpad 202. In some examples, the input interface 130 may also include various components other than as illustrated in FIG. 6 such as, conductive threads, conductive fabric, printed circuits etc. that may be arranged in a configuration of the input interface 130 to record the user input. In some examples, thin (0.1-10 mm thick) sheets of metals may be used to design conductive layers. Further, in some examples, a pressure sensitive film along with an open cell foam and conductive layers on each side may be used.

Figure 7:
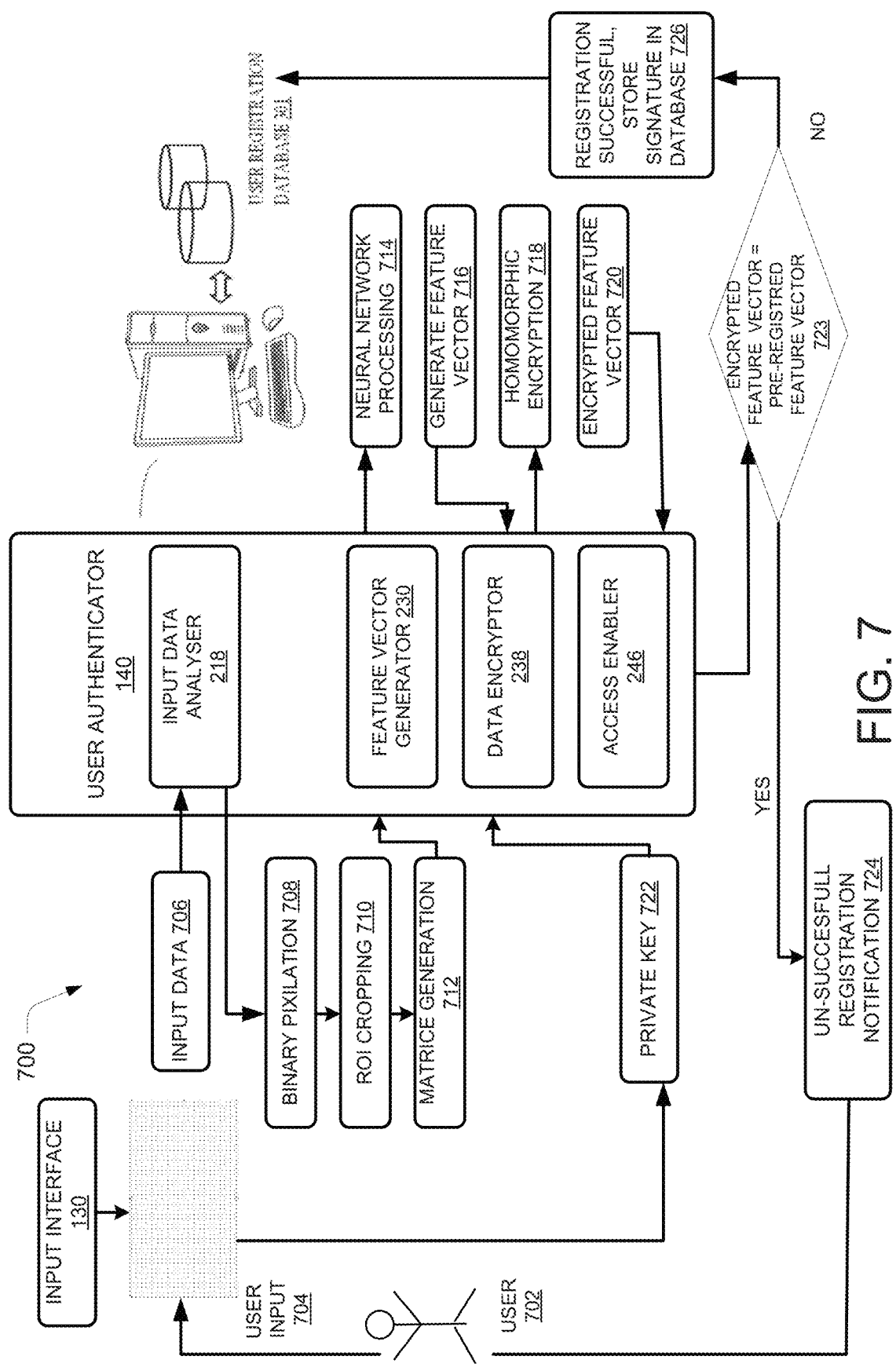
FIG. 7 is a pictorial representation illustrating a use case example of a registration of a user by the system for user authentication, according to an example embodiment of the present disclosure.

FIG. 7 illustrates an example of pictorial representation of a system representing a use case for the registration of the unique identifier signature or pattern of the user. In an example embodiment, for registration purposes, a user 702 may provide a user input 704 on the input interface 130. The user input 702 may be a unique identifier (e.g., a signature, a passcode, a pattern etc.) that may be used to uniquely identify or recognize the user 702. In an example, the user registration may require the user to provide the user input for a pre-defined number of times on the input interface 130. In other words, the user 702 may be requested to mark his or her signature on the input interface 130 more than once (e.g., five times) on the input interface 130. In an example, these inputs may be provided by the user 702 for registration at a registration kiosk.

As illustrated, an input data 706 including the user input 704 may be obtained by the user authenticator 140. The input data 706 may be obtained for registration of the user. In some examples, the input data 706 may include additional information (e.g., additional details related to the user) along with the unique identifier that may be provided by the user on the input interface 130 for purpose of completing the user-registration. The input data analyzer 218 of the user authenticator 140 may analyze the input data 706. The input data analyzer 218 may analyze the input data 706 to identify various characteristics from the user input 704. Some examples of the characteristics that may be derived from the user input 704 (e.g., pressure values at various touchpoints, directionality information associated with the signature on the input interface 130 etc.) are described earlier in reference to FIG. 1-6.

Accordingly, the input data 706 may be analyzed by the user authenticator 140 to determine various characteristics associated with the input data 706. For instance, in an example, the input data analyzer 218 of the user authenticator 140 may perform a binary pixelation 708 to identify a set of sensor electrodes of the input interface 130 that may have been actuated by the user input 704. The input data analyzer 218 may associate a binary value '1' with the set of electrodes and binary value '0' with remaining electrodes (i.e. which may not be actuated while receiving the user input 704. Further, the input data analyzer 218 may perform a region of interest (ROI) cropping 710 to identify a portion of the input interface 130 associated with the set of the sensor electrodes.

Further, a matrix generation 712 may be performed by the input data analyzer 218. In an example, the matrix generation may be performed by utilizing a portion of the user input 704 that may have been received on the identified region of interest. In other words, according to some example embodiments, various steps for constructing the binary matrix, the pressure matrix, and the orientation matrix may be performed by the input data analyzer 218 by utilizing information related to the user input 704 corresponding to the region of interest. Alternatively, in another example, the matrix generation 712 may be performed for the user input 704 that may be received on entire resolution of the screen of the input interface 130. In an example, the input data analyzer 218 may perform the matrix generation 712 to generate, for example, a binary matrix, a pressure matrix, and an orientation matrix, as described earlier in reference to FIGS. 1-6.

In an example, a first set of data values indicative of the set of sensor electrodes in the region of interest of the input interface 130 may be used to generate the binary matrix. Further, in an example, a second set of data values indicative of pressure applied at each sensor electrode of the set of sensor electrodes in the region of interest of the input interface 130 may be used to generate the pressure matrix. Furthermore, a third set of data values indicating directionality information, e.g., a sequence of the actuation of the set of sensor electrodes in the region of interest of the input interface 130 may be used to generate the orientation matrix. In an example, user authenticator 140 may perform neural network processing 714 by providing the binary matrix, the pressure matrix, and the orientation matrix as an input to an input layer of a neural network. In an example, the feature vector generator 230 may process the pressure matrix, the orientation matrix, and the binary matrix through multiple network layers of the neural network to generate a feature vector 716 as an output. As described earlier, the feature vector 716 may be an indicative of a unique identifier of the user 702. Further, the feature vector 716 may be encrypted by the data encryptor. In an example, homomorphic encryption 718 may be performed on the feature vector 716 to generate an encrypted feature vector 720. In an example, the user authenticator 140 may obtain a private key 722 from the user 702 to perform encryption of the feature vector 720.

In accordance with an example, the access enabler 246 may use the encrypted feature vector 720 for performing registration of the user 702. In this regard, the encrypted feature vector may be stored in the user registration database 304 that may be coupled to the user authenticator 140. Registration of the user 702 may also include associating the encrypted feature vector with other additional user data that may be provided by the user 702. In an example, the access enabler 246 may perform an evaluation 723 based on the encrypted feature vector 720. This may include performing a comparison of the encrypted feature vector 720 with pre-existing feature vectors that may be stored in the user registration database 304. In an example, if the encrypted feature vector data matches with the pre-registered feature vector 248, the entered feature vector may not be used for registration of the user. In such a case, the access enabler 246 may send an un-successful registration notification 724 to the user 702. Further, the user authenticator 140 may also prompt the user 702 to draw another unique identifier on the input interface 130 to reinitiate an attempt of performing the user registration.

In another example, in case the encrypted feature vector data does not match with the pre-registered feature vector 248, the encrypted feature vector may be used for registration of the user 702. Accordingly, the access enabler 246 may register the user and store 726 the encrypted feature vector 720 along with other user related information in the user registration database 702. In some examples, the user 702 may also be notified about the successful registration. Such a notification may be provided to the user 710 by an output device (e.g., the output device 150) in the form of a visual feedback, or audible feedback, or a haptic response.

Figure 8:
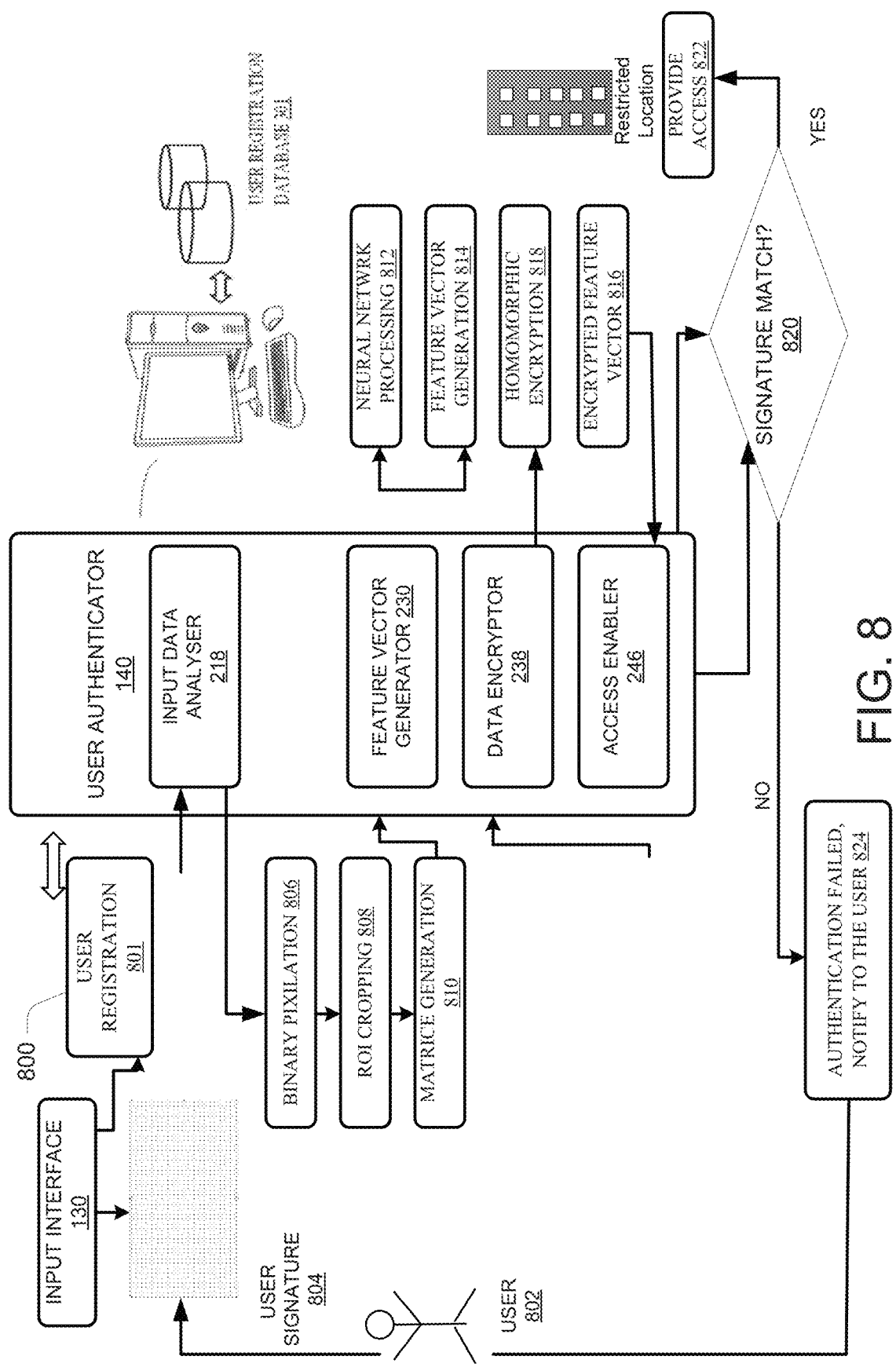
FIG. 8 is a pictorial representation illustrating another use case example of authentication of the user by the system, according to an example embodiment of the present disclosure.

FIG. 8 is a pictorial representation illustrating another use case example of authentication of a user 802 by the system (100, 300), according to an example embodiment of the present disclosure. Based on the authentication, the user may be authorized to access a secured location. The authentication may be performed by receiving a user input (e.g., a unique identifier) from the user on the input interface 130 and evaluating the user input to match an existing entry in the user registration database 304. In an example, the user 802 may be a registered user (e.g., the user 702). In this aspect, the user authenticator 140 may perform a user registration 801 by obtaining a user signature 804 and registering the user by using a feature vector derived from the user input, details of which are described already in reference to FIG. 7.

In some examples, the user 802 (e.g., a new user) may not have performed the user-registration and may request for an access. In other words, in some examples, a user with malicious intent to access the restricted location or secured system may attempt to obtain access by providing his/her input on the input interface 130. In such a case, the system (100, 300) may deny the access to the user 802 based on a result or outcome of the authentication as described hereinafter.

As illustrated, a process for authentication of the user to obtain an authorized access may start from the user 802 providing an input (e.g. the user signature 804) on the input interface 130. In an example, the user 802 may provide the input 804 by drawing a unique identifier (e.g., a signature, a passcode, a pattern etc.) as a representation of his/her identity on the input interface 130. In accordance with an example, the user input 804 provided by the user 802 on the input interface 130 may be analyzed by the user authenticator 140. The user authenticator 140 may obtain the input 804 for authenticating the user 802.

Further similar to as described in reference with FIG. 7, the input data analyzer 218 may analyze the user input 804 to identify various characteristics and generate a feature vector. In this aspect, binary pixelation 806 may be performed by using the user input 804. The binary pixelation 806 may provide an output represented in a digital image format with each pixel corresponding to a sensor electrode and holding a binary value. As described earlier in reference to FIG. 7, an output file by performing the binary pixelation may include a first set of binary values '1' representative of set of sensor electrodes of the input interface 130 that may be actuated based on the user input 804 and a second set of binary values '0' representative of remaining set of sensor electrodes that may not recorded any change in its sensing value in response to the user input 804. Further, the input data analyzer 218 may perform region of interest (ROI) cropping 808 to identify a portion of the input interface 130 that may be associated with the set of the sensor electrodes actuated based on the user input 804. Further, matrix generation 810 may be performed by the input data analyzer 218. In an example, the matrix generation may be performed with respect to a portion of the user input 804 that may have been received on the region of interest of the input interface 130 identified based on the ROI cropping 808.

Alternatively, in another example, the matrix generation 810 may be performed for the user input 804 that may be received on entire resolution of the screen of the input interface 130. Based on the matrix generation 810 various matrices may be constructed using the user input 804. For instance, a binary matrix, a pressure matrix, and an orientation matrix, as described earlier in reference to FIGS. 1-7 may be constructed.

Further, the user authenticator 140 may perform neural network processing 812 by using the binary matrix, the pressure matrix, and the orientation matrix data as an input to the neural network 232. A feature vector 814 may be generated as an output from the neural network 232. In response to generation of the feature vector, the user authenticator 140 may request the user 802 to provide a private key. In this aspect, the user may have to provide a same private key, as he or she may have provided at a time of performing a registration. In an example, the key may be an employee personnel number, employee ID, a combination of employee personnel number and ID, a code created by the organization for each person, or department, or group in the firm. In an example, in that case, the second input may not be required. Further, the feature vector 814 may be encrypted by the data encryptor and an encrypted feature vector 816 may be generated. In an example, the data encryptor may encrypt the feature vector 814 based on homomorphic encryption 818. In this aspect, the feature vector 816 may be encrypted using the private key and the homomorphic encryption algorithm. In an example, the homomorphic encryption algorithm may be based on a Brakerski/Fan-Vercauteren (BFV) scheme. In another example, the homomorphic encryption algorithm may be based on a Cheon-Kim-Kim-Song (CKKS) scheme. In another example, the homomorphic encryption algorithm may be one of the homomorphic encryption schemes used by different libraries such as PALISADE software or Microsoft SEAL According to an example embodiment, the access enabler 246 of the user authenticator 140 may perform a signature matching 820 that may involve a comparison of the encrypted feature vector 816 with the pre-registered encrypted feature vectors 248 that may be stored in the user registration database 304. The pre-registered encrypted feature vectors 248 may be such feature vectors in encrypted format that may have been stored in the user registration database 304 at a time of performing registration of a user. According to some example embodiments, performing encryption based on homomorphic encryption techniques by the data encryptor enables comparison of the encrypted feature vectors with other existing encrypted features directly i.e. in encrypted format itself without performing any decryption, thereby, reducing an execution time required for authenticating the user 802.

Based on the comparison, the access enabler 246 may identify if the encrypted feature vector 816 matches with any of the pre-registered encrypted feature vectors 248. In case of a successful signature match (i.e. matching of the encrypted feature vector 816 with any of the pre-registered encrypted feature vectors 248), the access enabler 246 may authenticate the user 802 and provide access to the user 802. In an example, upon successful authentication, the access enabler 246 may provide access 822 to a restricted location (e.g., an office building, a sports complex, a data center etc.) to the user 802. In another example, upon successful authentication, the access enabler 246 may provide access to a secured system (e.g., a laptop, a hard disc drive, a locker etc.) to the user 802. Alternatively, in case of the encrypted feature vector 816 not matching with any pre-registered feature vectors, the access enabler 246 may deny the access to the user 802. In an example, the access enabler 246 may provide a feedback 824 to the user 802 based on successful or non-successful authentication of the user 802. In an example, the feedback may be a notification indicative of un-successful authentication and may indicate the user to re-attempt for authentication by providing the user input 804 again on the input interface 130.

In accordance with some example embodiments, the comparison (i.e. signature match) of the encrypted feature vector with the pre-registered encrypted feature vectors 248 in the user registration database 304 may involve computing a similarity score by the access enabler 246. The access enabler 246 may calculate a similarity score based on the comparison. The similarity score may indicate a level of similarity between two signatures (i.e. two encrypted feature vectors). For example, a similarity score of 0.8 on a scale of 1 may indicate 80% similarity between two inputs. Further, the access enabler 246 may evaluate the similarity score against a pre-defined threshold to authenticate the user 802. In an example, in case of the similarity score exceeding or matching the pre-defined threshold, the access enabler 246 may authenticate the user 802 and provide him/her access to the restricted location. Alternatively, the access enabler 246 may deny the access to the user 802. The pre-defined threshold may be defined based on various authentication rules 250. For instance, for providing access to a person with a disability, a relatively lower value of the pre-defined threshold may be set compared to usual value of the pre-defined threshold. In another example, for granting access to critical areas or applications, a relatively higher value of pre-defined threshold may be set by the access enabler 246.

According to some example embodiments, using homomorphic encryption techniques by the data encryptor enables manipulating and processing the encrypted feature vector without a requirement for decryption. For instance, steps of comparison of the encrypted feature vectors with other existing encrypted features, calculating of similarity score, evaluation of similarity score against the pre-defined threshold etc. may be performed by the user authenticator 140 directly in encrypted format without performing any decryption, thereby reducing an execution time required for authenticating the user 802.

Figure 9:
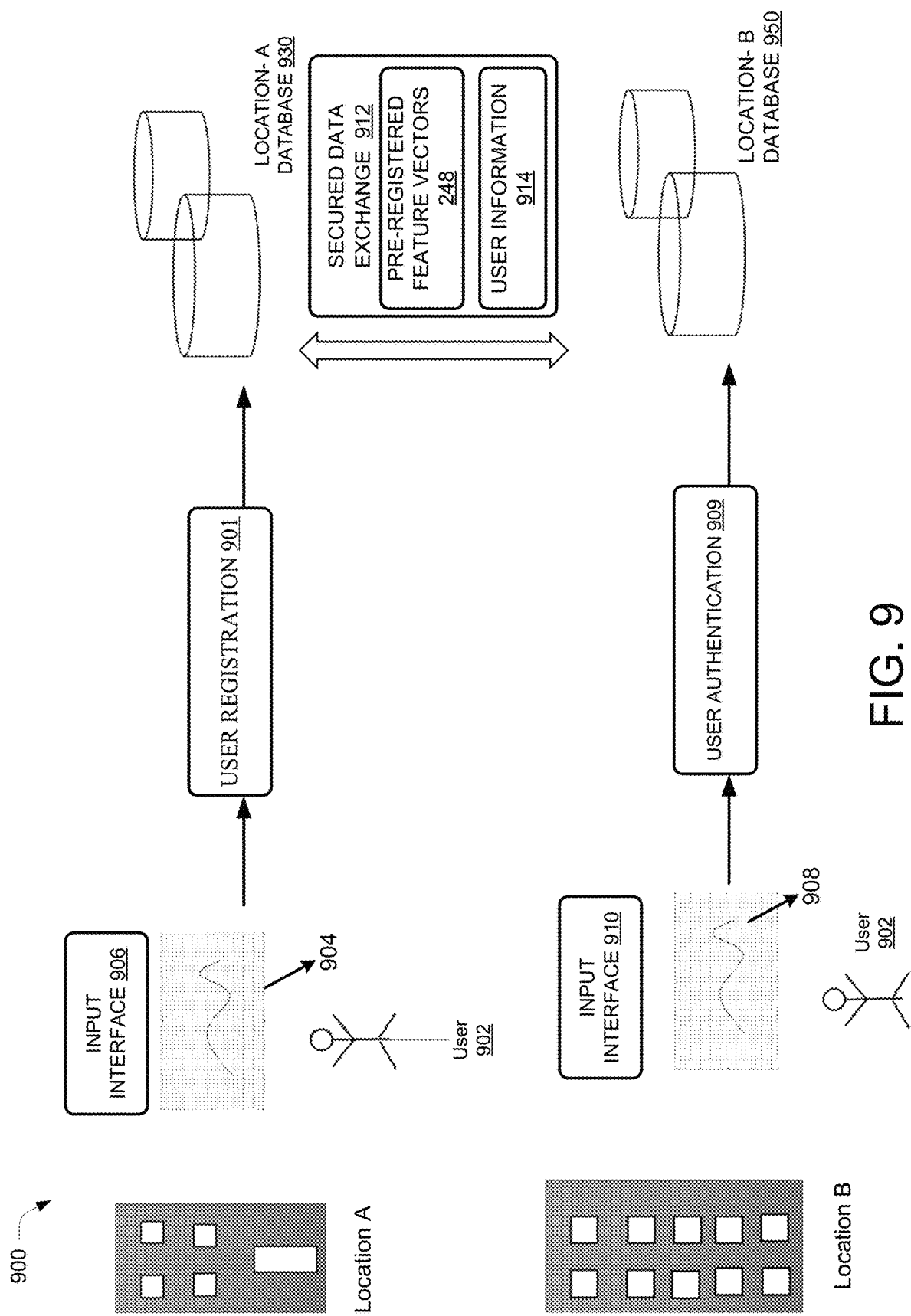
FIG. 9 illustrates a pictorial representation of an example scenario illustrating a user registration and user authorization at different locations, according to an example embodiment of the present disclosure.

FIG. 9 illustrates a pictorial representation of an example scenario illustrating a user registration and user authorization that may be performed at different locations, according to an example embodiment of the present disclosure. According to an example embodiment, a user 902 may be authorized to access multiple secured locations based on performing a one-time registration at any one of the locations.

In an example, a user 902 may register himself/herself at a first location (e.g., Location A) by providing his/her credentials at the first location. The user 902 may use the same credentials to obtain an access to a second location (e.g., Location B). For instance, in an example, the user 902 may be an employee that may perform his registration at a first corporate building of an office. This may involve the user 902 to provide a first user identifier 904 (e.g. credential information, passcode etc.) on a first user interface 906 that may be installed at an entry gate of the first corporate building. Further, at a later instance of time, the user 902 may have to visit a second corporate building of the same office. In such a situation, he or she may not have to register himself/herself again. Accordingly, the user 902 may attempt to obtain access to the second corporate building of the same office by providing a second user identifier 908 (e.g. a signature or a pattern) on a second input interface 910 that may be installed at an entry gate of the second corporate building.

As illustrated, the user 902 may perform a user registration 901 at Location A. The user 902 may provide his/her unique identifier (e.g., a signature, pattern, passcode etc.) as the first user identifier 904 on the first user interface 906 at the Location A. According to an example, the user registration 901 of the user 902 may be performed, in similar manner, as described earlier in reference to FIG. 7. For instance, the first user identifier 904 provided at the first input interface 906 at the Location A may be used to generate a feature vector that represents a unique identifier computed by utilizing various characteristics (e.g., location of touch points, pressure values, directionality information) determined from the user input. Further, the user 902 may also provide a private key of the user to encrypt the feature vector. The encrypted feature vector may be used for registration of the user 902 at the Location A. Further, the encrypted feature vector along with any additional information provided at a time of registration of the user 902 may be stored in a first database 930 associated with the location A.

As illustrated, the user 902 may seek to obtain an access to the location B. In such example, the user may provide his/her credentials, i.e. the second user identifier 908 on the second input interface 910 that may be installed at the Location B. Further, the user 902 may also provide his/her private key, as may be requested from him/her for performing a user authentication 909. In an example, authentication of the user 902 may be performed in a similar manner as described earlier in reference to FIG. 8. For instance, a feature vector may be generated based on the second user identifier 908 that the user 902 may have provided on the second input interface 910 while requesting the access to the location B. Further, the feature vector may be encrypted by using the private key provided by the user 902 at the Location B.

Furthermore, a comparison of the encrypted feature vector may be performed with the pre-registered encrypted feature vectors 248. The pre-registered encrypted feature vectors 248 represent such feature vectors in homomorphically encrypted format that may be associated with pre-registered users. In this aspect, the second database 950 maintained at the location B may obtain the pre-registered encrypted feature vectors 248 from other databases that may be maintained and/or associated with different locations. As illustrated, a secured data exchange 912 between the first database 930 and the second database 950 may be performed to obtain the pre-existing encrypted feature vectors 248. The secured data exchange may involve sharing of pre-existing feature vectors 248 (e.g., feature vectors associated with users registered at Location A) in encrypted format with the second database 950 at the location B. In an example, additional information of the user e.g., user name, place of residence etc. associated with the pre-existing encrypted feature vectors 248 may also be provided as user data 914 to the second database 916. In some example embodiments, the secured data exchange 912 may be performed between one or more databases in a seamless manner. For instance, in an embodiment, multiple databases may periodically perform a synchronization activity amongst each other to share and exchange the registration information of the users in an encrypted format.

The user authentication 909 may involve comparison of the encrypted feature vectors with the pre-existing encrypted feature vectors obtained from the secured data exchange 914. As according to some examples, the feature vectors may be encrypted based on any homomorphic encryption technique, the encrypted feature vector may be compared with the pre-existing encrypted feature vectors directly in encrypted format without performing any decryption. This may reduce a wait time at the user's 902 end to obtain the access in response to providing the second user identifier 908 on the second input interface 910 at the location B. Further, based on the comparison, the user 902 may be authenticated and provided access to the location B. Accordingly, referring back to stated example, the employee may obtain access to the second corporate building if he/she may have registered already at the first corporate building earlier.

Figure 10:
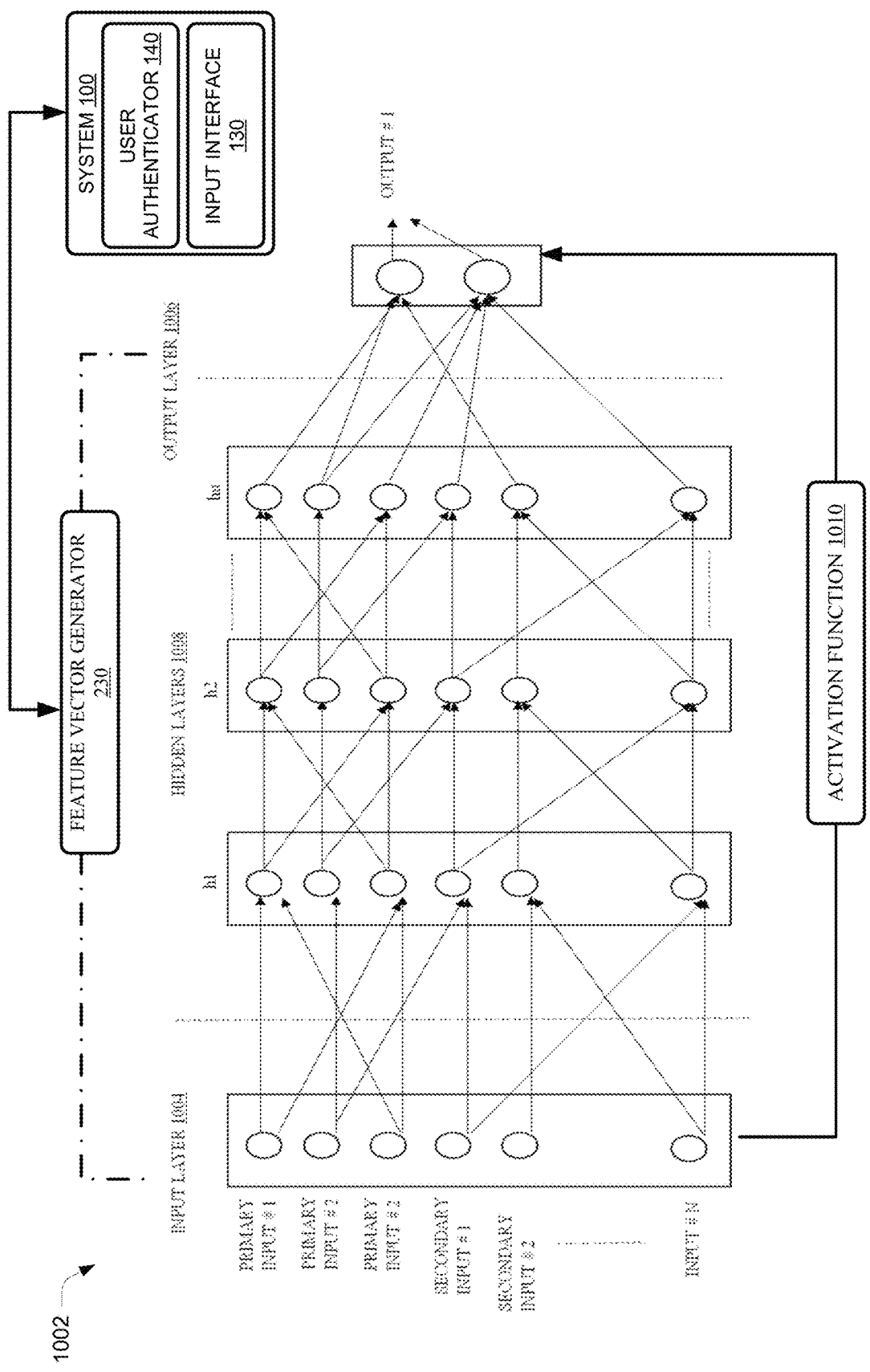
FIG. 10 illustrates a pictorial representation of generation of a feature vector by a feature vector generator of the system, according to an example embodiment of the present disclosure.

FIG. 10 illustrates a pictorial representation of generation of the feature vector 236 by the feature vector generator 230 of the system, according to an example embodiment of the present disclosure. In accordance with an example embodiment, the feature vector generator 230 may employ a neural network 1002 for processing an input data and generate the feature vector 236 as an output. In an example, the feature vector generator 230 may provide information related to matrices derived from the user input on the input interface 130, as an input to an input layer 1004 of the neural network 1002. For instance, the feature vector generator 230 may provide data pertaining to a binary matrix, a pressure matrix, and an orientation matrix as an input to the input layer 1004 of the neural network 1002. As described earlier in reference to FIGS. 1-9, the binary matrix, the pressure matrix, and the orientation matrix may be determined based on analyzing a user input by the input data analyzer 218. The user input may correspond to an input provided by the user on the touchpad 202 of the input interface 130. Further, as described earlier, data pertaining to the binary matrix, the pressure matrix, and the orientation matrix may correspond to various characteristics (e.g. location, pressure, directionality information) that may be derived by the input data analyzer 218 by analyzing the user input.

Accordingly, in an example embodiment, the binary matrix data 224 may be provided as a primary input #1, the pressure matrix data 226 may be provided as a primary input #2, and the orientation matrix data 228 may be provided as a primary input #3, and likewise. In an example, the neural network 1002 may correspond to a deep neural network (e.g. a convolutional neural network or a recurrent neural network) having the input network layer 1004, an output network layer 1006, and multiple hidden network layers ($h_1 \ldots h_n$) 1008. The neural network employed by the feature vector generator 230 may be based on any machine learning techniques such as, but not limited to, a probabilistic classification model, a linear classification model, a Bayesian network, decision tree model, and/or the like. In some examples, the neural network may be based on a support vector machine classifier that may determine one or more patterns and/or features from the input data. In some examples, each network layer may process an input data to that network layer using an activation function 1010 (e.g. a ReLU function etc.) and provide the output as an input to the next network layer.

In one example embodiment, the feature vector generator 230 may construct an average matrix from each of the three matrices (i.e. binary, pressure, and orientation). Further, the average matrices may be provided as input data to the input layer 1004 of the neural network 1002. Alternatively, in another example embodiment, the feature vector generator 230 may generate multiple feature vectors by providing data pertaining to various matrices individually to the input layer 1004. Further, the feature vector generator 230 may compute an average feature vector based on averaging the multiple feature vectors. In some example embodiments, the neural network 1002 may also be utilized by the feature vector generator 230 to compute a similarity score of the generated feature vector with existing feature vectors. The similarity score may be compared with a threshold value to ensure that the feature vector generated as an output (Output #1) of the neural network 1002 is unique and not similar to any other existing feature vectors.

Figure 11:
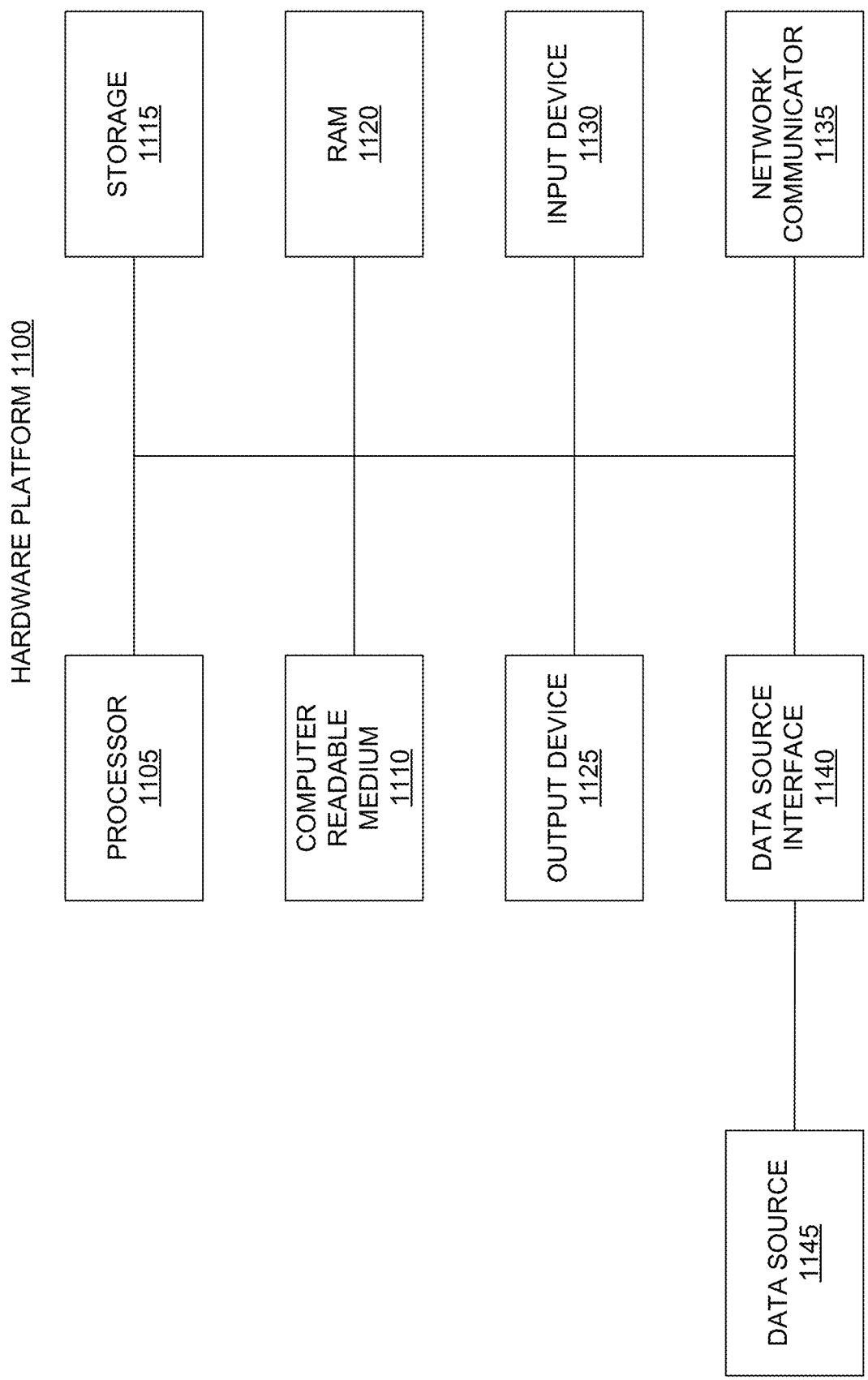
FIG. 11 illustrates a hardware platform for the implementation of a system for user authentication, according to an example embodiment of the present disclosure.

FIG. 11 illustrates a hardware platform 1100 for implementation of the system 100, according to an example embodiment of the present disclosure. Particularly, computing machines such as but not limited to internal/external server clusters, quantum computers, desktops, laptops, smartphones, tablets and wearables which may be used to execute the system 100, 300 or may have the structure of the hardware platform 1100. The hardware platform 1100 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

As shown in FIG. 11, the hardware platform 1100 may be a computer system 1100 that may be used with the examples described herein. The computer system 1400 may represent a computational platform that includes components that may be in a server or another computer system. The computer system 1100 may execute, by a processor (e.g., a single or multiple processors) or other hardware processing circuit, the methods, functions, and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 1100 may include a processor 1105 that executes software instructions or code stored on a non-transitory computer-readable storage medium 1110 to perform methods of the present disclosure. The software code includes, for example, instructions to register and authenticate a user based on a pattern or a signature that may be identified as a unique identifier of the user. In an example, the input interface 130 (comprising one or more of the touch screen 202, the sensor arrays 204, the haptic feedback generator 206, the PCB 208), the user authenticator 140, and the output device 150, and/or its associated components as described in reference to FIGS. 1-11, may be software codes or components performing these steps.

The instructions on the computer-readable storage medium 1110 are read and stored the instructions in storage 1115 or in random access memory (RAM) 1120. The storage 1115 provides a large space for keeping static data where at least some instructions could be stored for later execution. The stored instructions may be further compiled to generate other representations of the instructions and dynamically stored in the RAM 1120. The processor 1105 reads instructions from the RAM 1120 and performs actions as instructed.

The computer system 1100 further includes an output device 1125 to provide at least some of the results of the execution as output, including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1100 further includes input device 1130 to provide a user or another device with mechanisms for entering data and/or otherwise interact with the computer system 1100. The input device 1130 may include, for example, a keyboard, a keypad, a mouse, or a touchscreen. In an example, the input device 1130 may be used to provide an input. In an example, the input device 1130 may correspond to the input interface 130. In an example, an output from various components of the system (100, 300) may be provided by the output device 1125. In some examples, the output device 1125 may correspond to the output device 150. Each of these output devices 1125 and input devices 1130 could be joined by one or more additional peripherals.

A network communicator 1135 may be provided to connect the computer system 1100 to a network and, in turn, to other devices connected to the network, including other clients, servers, data stores, and interfaces, for instance. A network communicator 1135 may include, for example, a network adapter such as a LAN adapter or a wireless adapter. The computer system 1100 includes a data source interface 1140 to access data source 1145. A data source is an information resource. As an example, a database of exceptions and rules may be a data source. Moreover, knowledge repositories and curated data may be other examples of data sources.

Figure 12A:
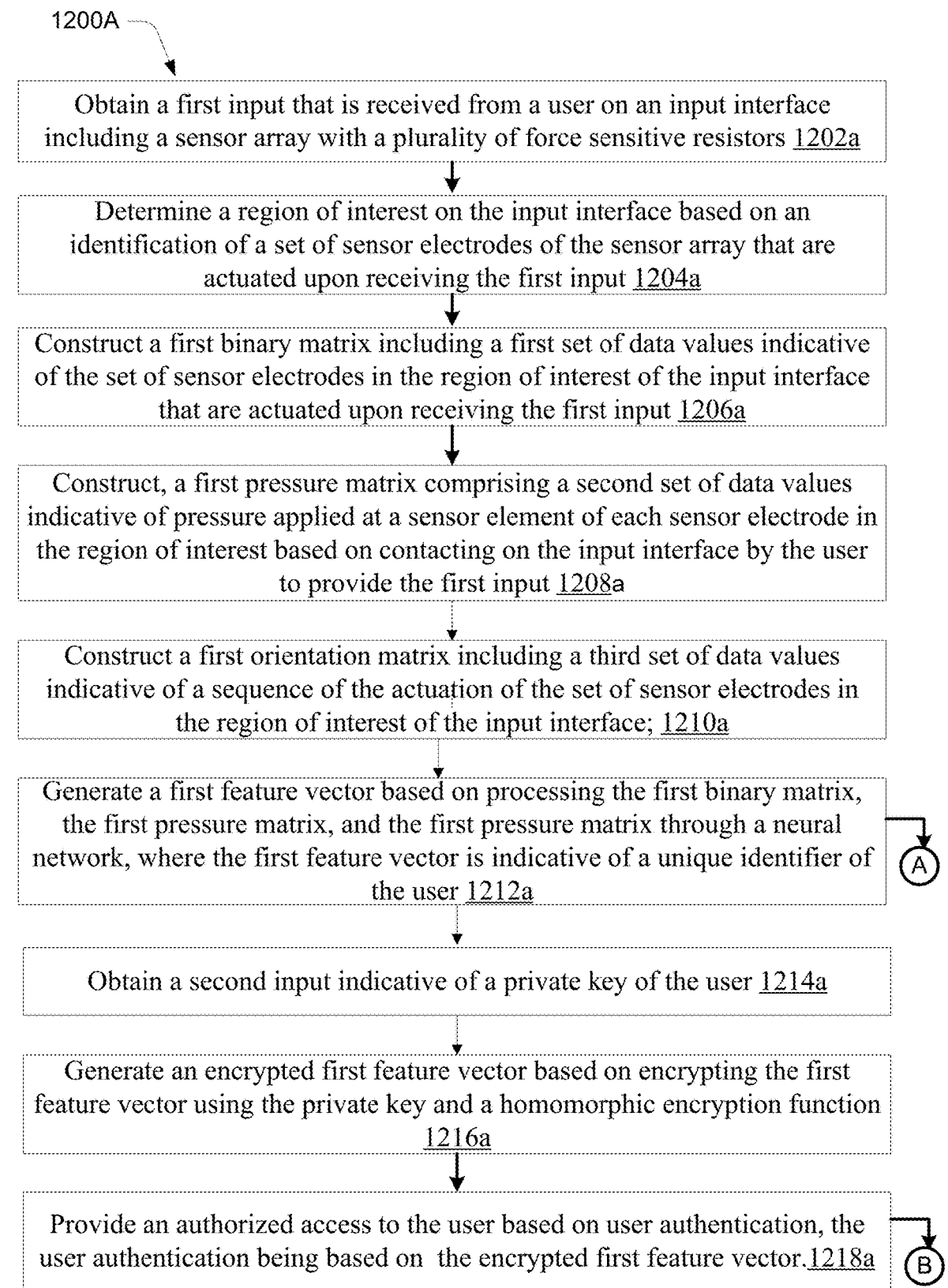
FIG. 12A illustrates a process flowchart for a method of registering a user for user authentication, according to an example embodiment of the present disclosure.

FIG. 12A illustrates a process flowchart of a method 1200A for registering a user, in accordance with an example embodiment described herein. In an example, the method 1200A may be performance in an instance when a user wants to get himself/herself registered for an authorized access. In an example, the authorized access may be a restricted area such as, corporate offices, banks, residential buildings, datacenters etc. In another example, the authorized access may be for accessing electronic devices such as, mobile phones, computers or digital information such as, data files, digital wallets, etc. In another example, the authorized access may be for accessing other secured objects such as, lockers, cabinets etc.

At block 1202*a* a first input that may be received from a user may be obtained. In an example, the user input may be received on the input interface 130. As described earlier, the input interface 130 may include the sensor array 204 with multiple force sensitive resistors 214. In an example, the first input may be obtained to initiate a process for registering the user for an authorized access. The first input may be indicative of a signature, a passcode, a PIN, a pattern, and/or the like which the user may provide as his or her unique identity for registration. For instance, in an example, a person may register his or her identity for getting access to a building (e.g., a corporate office). In another example, the user input may be received on the touchpad to obtain access to an electronic device (e.g., a smartphone or a datacenter).

In an example, the user input may correspond to a marking (e.g., a signature, pattern, PIN etc.) that may be provided by the user on the touchpad 202 by continuous marking on a screen of the touchpad 202 using his/her fingers. In another example, the user input may correspond to a marking (e.g., a signature, pattern, PIN etc.) that may be provided by the user on the touchpad 202 based on intermittent gestures or multi-motion of the user's fingers on the screen of the touchpad 202. In other words, the user may include multiple markings that may be provided on the screen rather than a continuous marking. In another example, the user input may correspond to a marking (e.g., a signature, pattern, PIN etc.) that may be provided by the user on the touchpad 202 by using a stylus pen.

Moving to block 1204*a*, the region of interest 222 on the touchpad 202 may be determined. As described earlier in reference to the FIGS. 1-10, the region of interest 202 may be determined based on an identification of a set of sensor electrodes of the sensor array 204. The set of sensor electrodes are those sensor electrodes that may be actuated upon receiving the first input. Said differently, the region of interest 222 may correspond to a portion of the touchpad 202 on which the user may have provided his/her markings as the first input.

In an example, the region of interest 222 may correspond to a cropped portion of the touchpad 202 of the input interface 130. Thus, the region of interest 222 may include few sensor electrodes from amongst all of the sensor electrodes 212 of the input interface 130. Accordingly, the region of interest 222 may be identified based on selecting that portion of the input interface 130 which includes the set of sensor electrodes that may have been actuated from amongst all of the sensor electrodes 212 of the input interface 130 in response to the user input 220. To identify the region of interest 222, the processor 120 may read digital signals associated with respective sensor electrodes in the form of binary values i.e. 1 and 0 and construct a digital file (e.g., jpeg, png., bmp. image file) of size smaller than full resolution of the input interface 130 that includes maximum number of binary values '1'. This digital file may represent a cropped portion of the input interface 130. According to some example embodiments, various steps involved for analyzing the user input may be performed with respect to the identified region of interest to simplify computations, save processing capability, and resource consumption of various components of the system 100.

At block 1206*a*, a first binary matrix may be generated. The first binary matrix may be generated based on analysis of the user input. As described earlier in reference to FIGS. 1-10, the first binary matrix may be generated based on identification of one or more characteristics from the user input. The binary matrix may include the binary matrix data having a first set of data values. The first set of data values may be indicative of the set of sensor electrodes in the region of interest of the touchpad that are actuated upon receiving the first input. In an example, the binary matrix may correspond to a two-dimensional matrix that may include binary values i.e. '0' or '1'. Each coordinate of the binary matrix may correspond to a position (e.g. a touchpoint or contact point) on the touchpad 202 and an associated sensor electrode to the touchpoint. As may be understood, the binary matrix may include a data value '1' corresponding an actuation of the sensor electrode (i.e. sensor electrode at which a user contact may be received) and a data value '0' corresponding to a non-actuation of some of the sensor electrodes (i.e. sensor electrodes on which no contact from the user is received).

Moving to block 1208*a*, a first pressure matrix may be generated. The first pressure matrix may be generated based on set of data values indicative of a multiple pressure values. The first set of pressure value may be indicative of the set of sensor electrodes in the region of interest of the touchpad that may be associated with the actuation of a respective sensor electrode of a set of sensor electrodes.

At the block 1210*a*, a first orientation matrix may be generated. The first orientation matrix may be generated based on an analysis of the input data. The first orientation matrix may store directionality related information (e.g., a sequence of electrodes in order of activation) based on the user input. In an example, the first orientation matrix may include a set of data values that may be indicative of a sequence or an order in which one or more sensor electrodes in the region of interest 222 of the input interface 130 may be activated. Accordingly, as described earlier in reference to FIGS. 1-2, the first orientation matrix may store directionality related information (e.g., a sequence of electrodes in order of activation) based on the user input (i.e. the first input).

According to various example embodiments, information pertaining to the pressure matrix and the orientation matrix along with the binary matrix information may enable to differentiate between two or more similar signatures or patterns that may be provided by two different users for registration purposes. In this aspect, these matrices may capture information pertaining to stylistic characteristics related to a user's way of writing or providing input on the touchpad 202. For instance, a user 'A' may have a tendency of marking a signature by moving his/her fingers from top left to bottom right portion on the touchpad 202. Another user 'B' may have a tendency of marking a signature by moving his/her fingers from top right portion of the touchpad to bottom left portion of the touchpad 202. In such a case, even if both users 'A' and 'B' provide similar marking (e.g., pattern or signature) on the touchpad 202, the directionality information associated with respective signature may be different. Accordingly, the orientation matrix with directionality information derived from the first input may be constructed.

Moving to block 1212a, a first feature vector may be generated. The first feature vector may be generated based on processing the first binary matrix, the first pressure matrix and the first orientation matrix. As described earlier in reference to FIGS. 1-10, the first feature vector (e.g. the feature vector 236) may be generated by providing matrices related information (i.e. the first binary matrix, the first pressure matrix, and the first orientation matrix) as input data to the neural network 232. The matrix information may be processed to a through one or more network layers of the neural network 232 (e.g., a convolutional neural network). Accordingly, the first feature vector may be obtained as an output of the neural network 232. The first feature vector may represent a unique identifier of the user that may be generated by using various characteristics identifiable from the matrix information (e.g., location, pressure, directionality) associated with the user input. In an example, generation of the first feature vector may involve additional sub-steps. Further details of these additional steps as indicated by branch labelled 'A' in FIG. 12A are described in reference to FIG. 12B.

At block 1214a, a second input may be obtained from the user. In an example, the second input may be obtained on the touchpad 202. In another example, the second input may be obtained based on any input mechanism other than the touchpad 202, e.g., in the form of a spoken input. The second input may be indicative of the private key 222 of the user. As an example, the private key 222 provided by the user may be a signature, a pattern, or a pin. As described earlier in reference to FIGS. 1-10, the second input may be used for encrypting the feature vector 236.

At block 1216a, an encrypted first feature vector may be generated. The encrypted feature vector 244 may be generated by encrypting the first feature vector using the private key 222 and an encryption function 242 (e.g. a homomorphic encryption function). In an example, the encrypted feature vector 244 may be used to register the user. The registration may involve obtaining additional details associated with the user and linking it with the encrypted feature vector 244. Further details related to registration of the user using the encrypted feature vector 244 are described in reference to FIG. 12B.

Moving to block 1218a, an authorized access to the user may be provided based on user authentication. The user authentication may be performed based on the encrypted first feature vector 244. In an example, in response to successful authentication, the user may be provided an access to a restricted area (e.g., a corporate building, a residential complex etc.) or a secured device (e.g., a smartphone, a laptop, a machine etc.). Further details of these additional steps as indicated by branch labelled 'B' in FIG. 12A are described in reference to FIG. 12C.

In accordance with an example, the user may be notified in response to successful and/or unsuccessful registration of the user. The user may be notified regarding the successful and/or the unsuccessful according to various ways. For instance, in one example, the user may be notified based on a haptic feedback that may be provided to the user on the touchpad 202. In another example, the user may be notified by displaying a message on the display device 308. In another example, audio based notification (e.g., a beep sound) may be generated on the audio output device 310 to notify the user. According to some examples, different types of notifications may be generated to differentiate amongst any of a successful registration, an un-successful registration, a successful authentication, an un-successful authentication.

Figure 12B:
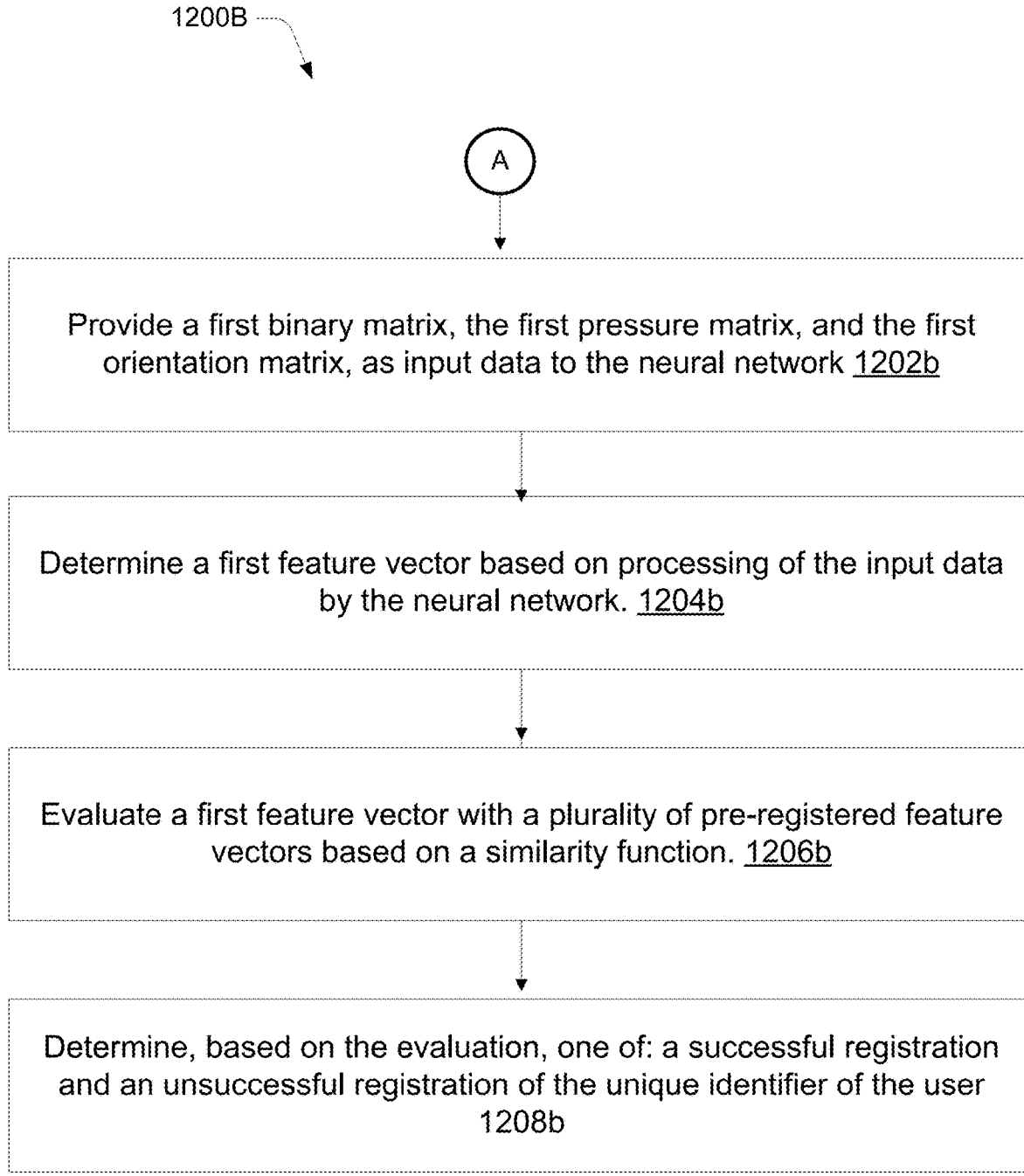
FIG. 12B illustrates a process flowchart for a method of notifying a user with regards to user registration, according to an example embodiment of the present disclosure.

FIG. 12B illustrates a process flowchart for a method 1200B of notifying a user with regards to user registration, according to an example embodiment of the present disclosure. In an example, the method 1200B may be initiated in response to construction of one or more of the first binary matrix, the first pressure matrix, and/or the first orientation matrix, as described in FIG. 12A.

At block 1202b, the first binary matrix, the first pressure matrix, and the first orientation matrix may be provided as input data to the neural network 232. In an example, the neural network 232 may correspond to a deep neural network (e.g., a convolutional neural network). The input data may be processed through one or more network layers of the neural-network, as described earlier in reference to FIGS. 1-10.

Moving to block 1204b, the first feature vector may be generated based on processing of the input data by the neural network 232. In an example, the first feature vector may represent a unique identifier of the user. The feature vector 236 can be indicative of a unique output value that may distinctly identify the user input. In other words, no two distinct user inputs can be used to generate a same feature vector 236 upon such processing by the neural network. Accordingly, the user authenticator 140 may be capable of determining different feature vectors for different touch based user inputs.

At block 1206b, the evaluation of the first feature vector with a multiple pre-registered feature vectors (e.g. the pre-registered feature vectors 248) may be performed based on a similarity function. In an example, the similarity function may be based on a cosine similarity technique. In another example, the similarity function may be based on a SSIM structural similarity index technique. In another example, the similarity function may be based on an L2 Norm (Or Euclidean Distance) technique. In another example, the similarity function may be based on Mahalanobis distance technique.

In an example, the similarity function may compute a Euclidean distance between two feature vectors to determine a similarity score between the two feature vectors. Accordingly, such an evaluation may be performed to ensure that is no similar signature existing in the user registration database 304 that may be currently assigned to other registered users.

At the block 1208b, based on the evaluation, a successful registration or an unsuccessful registration of the unique identifier of the user may be determined. In an example, based on the evaluation if the similarity score is above a pre-defined threshold, the determination of successful registration may be made. Alternatively, the unique identifier may be rendered as not suited for performing a successful registration. In response to the successful registration, the first feature vector may be added to the user registration database 304. Further, the first feature vector 236 may be encrypted by using a private key of the user. In an example, homomorphic encryption may be performed to encrypt the feature vector 236. Furthermore, the encrypted feature vector 244 generated upon the encryption may be stored in the user registration data 304 and associated with line items related to the user.

Furthermore, in some example embodiments, a notification may be generated that may indicate successful or un-successful registration of the user. For example, a first notification indicative of successful authentication of the person may be generated where the similarity score meets a pre-defined threshold. In another example, a second notification indicative of an unsuccessful authentication of the person may be generated where similarity score fails to meet the pre-defined threshold. In an example, these notifications may be provided by the output device 150. In one example, these notifications may be provided in form of a beep sound by the speaker 254. In another example, the notification may be provided in the form of haptic feedback by the haptic feedback generator 206, as described earlier in reference to FIG. 2. In another example, the notifications may be provided to the user in the form of message on a smartphone that may be carried by the user. In another example, the notifications may be provided to the user in the form of an email notification.

Figure 12C:
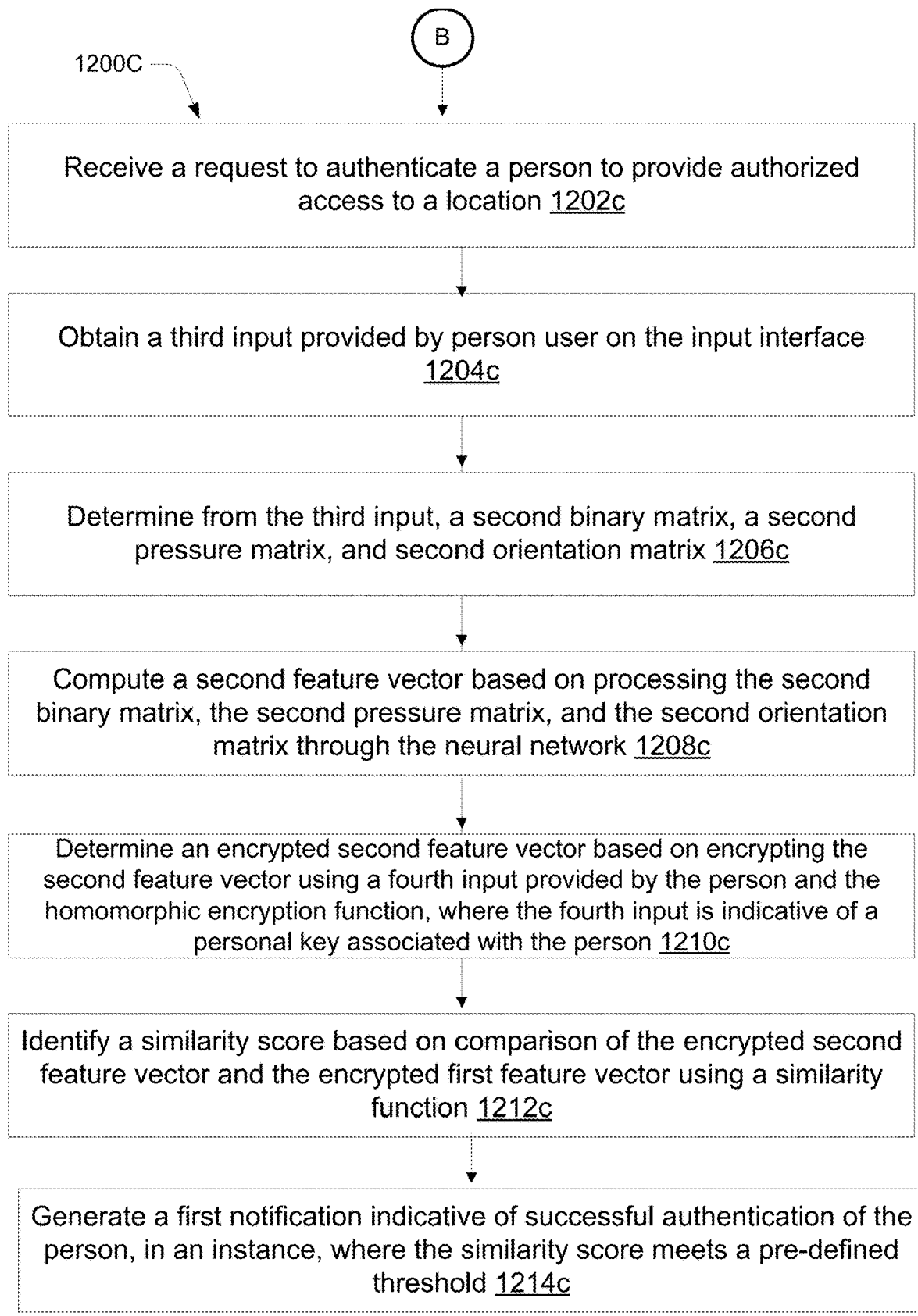
FIG. 12C illustrates a process flowchart for a method of authenticating a user for an authorized access, according to an example embodiment of the present disclosure.

FIG. 12C represents a process flowchart of a method 1200C for authentication of a person to obtain an authorized access to a secured location, in accordance with an example embodiment of the present disclosure. As illustrated at block 1202c, a request for authenticating a person may be received. The authentication request may be for providing an authorized access to the person. The authorized access may be to for accessing a secured location (e.g. restricted area, a digital file, a secured device etc.), as described earlier with various examples.

Moving to 1204c, a third input may be received from the person. In an example, the third input may correspond to an input which the person may provide to obtain access to an authorized area. As may be understood, in some example scenarios, the person may already have provided a first input for registration of his or her identity and a second input for encryption of a unique identifier (e.g. feature vector) that may be generated at a time of registration. In an example, the third input may be provided on the input interface 130 in the form of a unique marking (e.g., a signature, a pattern, a PIN, a passcode etc.) on the touchpad 202.

At block 1206c, the third input may be analyzed to determine various matrices. For instance, a second binary matrix, a second pressure matrix, and second orientation matrix may be determined from the third input. The second binary matrix, the second pressure matrix, and the second orientation matrix may be determined in a similar manner or based on similar technique as described earlier in FIGS. 1-12A with reference to the first binary matrix, the first pressure matrix, and the first orientation matrix.

In block 1208c, a second feature vector may be computed. The second feature vector may be computed based on processing the second binary matrix, the second pressure matrix, and the second orientation matrix through the neural network 232. In this aspect, the second feature vector may be obtained as an output from an output layer of the neural network 232 based on processing input data (i.e. the second binary matrix, the second pressure matrix, and the second neural network) through multiple network layers of the neural network 232. An example of generation of the feature vector using the neural network is described in reference to FIG. 10.

In block 1210c, an encrypted second feature vector may be generated based on encrypting the second feature vector. In an example, the encrypted second feature vector may be generated using a fourth input provided by the person. In an example, the encrypted second feature vector may be generated using the homomorphic encryption function. In an example, the fourth input may be an indicative of a private key associated with the person.

In block 1212c, a similarity score may be calculated. In an example, the similarity score may be calculated based on a comparison of the encrypted second feature vector with the encrypted first feature vector. In other words, the encrypted second feature vector generated from the third input (i.e. input provided at a time of requesting an access) may be compared with existing signatures (e.g. the pre-registered encrypted feature vectors 248). The similarity score may be calculated to evaluate if the signature generated at the time of authentication matches with any existing signature in the user registration database 304. The similarity score may indicate a level of similarity between two signatures (i.e. two encrypted feature vectors). For example, a similarity score of 0.8 on a scale of 1 may indicate 80% similarity between two inputs. As described earlier in reference to FIG. 8, an evaluation of the similarity score against a pre-defined threshold may be performed to authenticate the user. The pre-defined threshold may be defined based on various authentication rules 250. As an example, in case of the similarity score exceeding or matching the pre-defined threshold, the user may be authenticated. Alternatively, the user may be notified for a failed authentication attempt.

Moving to block 1214c, a first notification may be generated. In an example, the first notification may be an indicative of successful authentication of the person. In an example, the first notification may be generated, in an instance, where the similarity score meets a pre-defined threshold. Accordingly, based on successful authentication, the user may be authorized to access a secured location.

In some example embodiments, a second notification may be generated. The second notification may be an indicative of an unsuccessful authentication of the person. The second notification may be generated, in an instance, when similarity score fails to meet the pre-defined threshold.

According to various examples described herein, the methods 1200A-1200C may be practiced using a non-transitory computer-readable medium, for example, but not limited to the computer-readable medium 1210 as described in FIG. 12. In some examples, the methods 1200A-1200C may be computer-implemented methods.

We claim:

1. A system comprising:
   a processor;
   a touchpad coupled to the processor, the touchpad comprising:
     a printed circuit board comprising a microcontroller;
     a sensor array coupled to the printed circuit board, the sensor array comprising a plurality of sensor electrodes corresponding to a plurality of force sensitive resistors; and
   a user authenticator coupled to the processor, the user authenticator comprising:
     an input data analyzer to:
       obtain a first input received from a user on the touchpad;
       determine a region of interest on the touchpad based on identification of a set of sensor electrodes from amongst the plurality of sensor electrodes of the touchpad activated upon the first input;
       construct a first binary matrix comprising a first set of data values indicative of the set of sensor electrodes in the region of interest of the touchpad;

construct a first pressure matrix comprising a second set of data values indicative of a pressure applied on each of the set of sensor electrodes in the region of interest based on the first input; and construct a first orientation matrix comprising a third set of data values indicative of a sequence of the activation of the set of sensor electrodes in the region of interest of the touchpad;

a feature vector generator to:
generate a first feature vector based on processing the first binary matrix, the first pressure matrix, and the first orientation matrix through a neural network, wherein the first feature vector is indicative of a unique identifier of the user;

an encryption engine to:
obtain, a second input indicative of a private key of the user;
encrypt the first feature vector using the private key and a homomorphic encryption function to generate an encrypted first feature vector; and
store the encrypted first feature vector in a database by associating the encrypted first feature vector with user data provided by the user; and an access enabler to:
provide an authorized access to the user based on user authentication, the user authentication being based on the encrypted first feature vector.

2. The system as claimed in claim 1, wherein the feature vector generator is to further:
provide the first binary matrix, the first pressure matrix, and the first orientation matrix, as input data to the neural network; and
generate, the first feature vector based on processing of the input data by the neural network;
and wherein, the access enabler is to further:
compare, the first feature vector with a plurality of pre-registered feature vectors based on a similarity function; and
determine, based on the comparison, one of a successful registration and an unsuccessful registration of the unique identifier of the user.

3. The system as claimed in claim 2, wherein the access enabler is to further:
generate a feedback indicative of one of the successful registration and the unsuccessful registration of the unique identifier of the user.

4. The system as claimed in claim 1, wherein the user authenticator is to further:
receive, a request to authenticate a person to provide authorized access to a location;
and wherein the input data analyzer is to further:
obtain, a third input through the touchpad; and
determine from the third input, a second binary matrix, a second pressure matrix, and second orientation matrix;
and wherein the feature vector generator is to further:
compute a second feature vector based on processing the second binary matrix, the second pressure matrix, and the second orientation matrix through the neural network;
and wherein the encryption engine is to further:
determine, an encrypted second feature vector based on encrypting the second feature vector using a fourth input and the homomorphic encryption function, wherein the fourth input is indicative of a private key;
and wherein the access enabler is to further:
identify a similarity score based on comparison of the encrypted second feature vector and the encrypted first feature vector using a similarity function.

5. The system as claimed in claim 4, wherein the access enabler is to further:
generate a first notification indicative of successful authentication, when the similarity score meets a pre-defined threshold; and
generate a second notification indicative of an unsuccessful authentication, when the similarity score fails to meet the pre-defined threshold.

6. The system as claimed in claim 1, wherein the touchpad further comprises a vibration assembly to:
provide a first haptic feedback indicative of a successful registration of identity of the user based on the first input provided by the user on the touchpad; and
provide a second haptic feedback indicative of an unsuccessful registration of the identity of the user based on the first input provided by the user on the touchpad.

7. The system as claimed in claim 1, wherein the printed circuit board and the sensor array of the touchpad are defined on a flexible substrate made of piezoelectric material.

8. The system as claimed in claim 1, wherein the touchpad further comprises:
a plurality of pressure dependent voltage dividers, wherein each pressure dependent voltage divider of the plurality of pressure dependent voltage dividers comprises a force sensor and a resistor, wherein an output feed line of each pressure dependent voltage divider is coupled to an analog to digital circuitry, via a multiplexer.

9. A method comprising:
obtaining, by a processor, a first input received from a user on a touchpad, the touchpad comprising a plurality of sensor electrodes corresponding to a plurality of force sensitive resistors;
determining, by the processor, a region of interest on the touchpad based on identification of a set of sensor electrodes from amongst the plurality of sensor electrodes of the touchpad activated upon the first input;
constructing, by the processor, a first binary matrix comprising a first set of data values indicative of the set of sensor electrodes in the region of interest;
constructing, by the processor, a first pressure matrix comprising a second set of data values indicative of pressure applied each of the set of sensor electrodes in the region of interest upon contacting the touchpad to provide the first input;
constructing, by the processor, a first orientation matrix comprising a third set of data values indicative of a sequence of the activation of the set of sensor electrodes in the region of interest of the touchpad;
generating, by the processor, a first feature vector based on processing the first binary matrix, the first pressure matrix, and the first orientation matrix through a neural network, wherein the first feature vector is indicative of a unique identifier of the user;
obtaining a second input indicative of a private key of the user;
encrypting the first feature vector using the private key and a homomorphic encryption function to generate an encrypted first feature vector, wherein the encrypted first feature vector is associated with user data provided by the user; and providing an authorized access to the user based on user authentication, the user authentication being based on the encrypted first feature vector.

10. The method as claimed in claim 9 comprising:
providing, by the processor the first binary matrix, the first pressure matrix, and the first orientation matrix, as input data to the neural network;
determining, by the processor, the first feature vector based on processing of the input data by the neural network;
evaluating, by the processor, the first feature vector with a plurality of pre-registered feature vectors based on a similarity function; and
determining, based on the evaluation, one of a successful registration and an unsuccessful registration of the unique identifier of the user.

11. The method of claim 10 further comprising generating a feedback indicative of one of: the successful registration and the unsuccessful registration of the unique identifier of the user.

12. The method of claim 9 further comprising:
receiving, by the processor, a request to authenticate a person to provide authorized access to a location;
obtaining, by the processor, a third input provided on the touchpad to authenticate the person;
determining from the third input, a second binary matrix, a second pressure matrix, and second orientation matrix;
computing, by the processor, a second feature vector based on processing the second binary matrix, the second pressure matrix, and the second orientation matrix through the neural network;
determining, by the processor, an encrypted second feature vector based on encrypting the second feature vector using a fourth input and the homomorphic encryption function, wherein the fourth input is indicative of a private key; and
identifying, by the processor, a similarity score based on comparison of the encrypted second feature vector and the encrypted first feature vector using a similarity function.

13. The method of claim 12 further comprising:
generating, by the processor, a first notification indicative of successful authentication of the person, in an instance, where the similarity score meets a pre-defined threshold; and
generating, by the processor, a second notification indicative of an unsuccessful authentication of the person, in an instance, where similarity score fails to meet the pre-defined threshold.

14. The method of claim 9 further comprising:
transmitting, by the processor, a first command to a vibration assembly of the touchpad to provide a first haptic feedback indicative of a successful registration based on the first input on the touchpad; and
transmitting, by the processor, a second command to provide a second haptic feedback indicative of an unsuccessful registration based on the first input provided on the touchpad.

15. A non-transitory computer readable medium including machine readable instructions that are executable by a processor to:
obtain a first input received from a user on a touchpad, the touchpad comprising a plurality of sensor electrodes corresponding to a plurality of force sensitive resistors;
determine a region of interest on the touchpad based on identification of a set of sensor electrodes from amongst the plurality of sensor electrodes of the touchpad activated upon the first input;
construct a first binary matrix comprising a first set of data values indicative of the set of sensor electrodes in the region of interest;
construct a first pressure matrix comprising a second set of data values indicative of pressure applied each of the set of sensor electrodes in the region of interest upon contacting the touchpad to provide the first input;
construct a first orientation matrix comprising a third set of data values indicative of a sequence of the activation of the set of sensor electrodes in the region of interest of the touchpad;
generate a first feature vector based on processing the first binary matrix, the first pressure matrix, and the first orientation matrix through a neural network, wherein the first feature vector is indicative of a unique identifier of the user;
obtain a second input indicative of a private key of the user;
encrypt the first feature vector using the private key and a homomorphic encryption function to generate an encrypted first feature vector, wherein the encrypted first feature vector is associated with user data provided by the user; and
provide an authorized access to the user based on user authentication, the user authentication being based on the encrypted first feature vector.

16. The non-transitory computer-readable medium of claim 15 including the machine readable instructions that are executable by a processor to further:
provide the first binary matrix, the first pressure matrix, and the first orientation matrix, as input data to the neural network;
determine the first feature vector based on processing of the input data by the neural network;
evaluate the first feature vector with a plurality of pre-registered feature vectors based on a similarity function; and
determine, based on the evaluation, one of a successful registration and an unsuccessful registration of the unique identifier of the user.

17. The non-transitory computer-readable medium of claim 15 including the machine-readable instructions that are executable by the processor to further, generate a feedback indicative of one of: the successful registration and the unsuccessful registration of the unique identifier of the user.

18. The non-transitory computer-readable medium of claim 15 including the machine-readable instructions that are executable by the processor to further:
receive a request to authenticate a person to provide authorized access to a location;
obtain a third input on the touchpad to authenticate the person;
determine from the third input, a second binary matrix, a second pressure matrix, and second orientation matrix;
compute a second feature vector based on processing the second binary matrix, the second pressure matrix, and the second orientation matrix through the neural network;
generate an encrypted second feature vector based on encrypting the second feature vector using a fourth input and the homomorphic encryption function, wherein the fourth input is indicative of a private key; and identify a similarity score based on comparison of the encrypted second feature vector and the encrypted first feature vector using a similarity function.

19. The non-transitory computer-readable medium of claim 18 including the machine-readable instructions that are executable by the processor to further:
generate a first notification indicative of successful authentication of the person, in an instance, where the similarity score meets a pre-defined threshold; and
generate a second notification indicative of an unsuccessful authentication of the person, in an instance, where similarity score fails to meet the pre-defined threshold.

20. The non-transitory computer-readable medium of claim 15 including the machine-readable instructions that are executable by the processor to further:
transmit a first command to a vibration assembly of the touchpad to provide a first haptic feedback indicative of a successful registration based on the first input provided by the user on the touchpad; and
transmit a second command to provide a second haptic feedback indicative of an unsuccessful registration based on the first input provided by the user on the touchpad.

* * * * *